(12) United States Patent
Wang

(10) Patent No.: US 12,668,395 B2
(45) Date of Patent: Jun. 30, 2026

(54) STICKER MACHINE

(71) Applicant: Shenzhen Xiaoguan Technology Co., Ltd., Shenzhen (CN)

(72) Inventor: Tianlong Wang, Shenzhen (CN)

(73) Assignee: Shenzhen Xiaoguan Technology Co., Ltd., Shenzhen (CN)

( * ) Notice: Subject to any disclaimer, the term of this patent is extended or adjusted under 35 U.S.C. 154(b) by 136 days.

(21) Appl. No.: 18/641,676

(22) Filed: Apr. 22, 2024

(65) Prior Publication Data

US 2024/0351731 A1      Oct. 24, 2024

Related U.S. Application Data

(63) Continuation of application No. PCT/CN2024/087384, filed on Apr. 12, 2024.

(30) Foreign Application Priority Data

| | | |
|---|---|---|
| Apr. 24, 2023 | (CN) | 202320986078.X |
| Apr. 24, 2023 | (CN) | 202321007280.X |
| Aug. 3, 2023 | (CN) | 202322073984.3 |
| Aug. 3, 2023 | (CN) | 202322074062.4 |
| Aug. 15, 2023 | (CN) | 202322189130.1 |
| Aug. 15, 2023 | (CN) | 202322189177.8 |
| Oct. 23, 2023 | (CN) | 202322843296.0 |
| Jan. 11, 2024 | (CN) | 202420070955.3 |

(51) Int. Cl.
| | |
|---|---|
| *B32B 41/00* | (2006.01) |
| *A01M 29/12* | (2011.01) |
| *B65C 11/00* | (2006.01) |

(52) U.S. Cl.
CPC .......... *B65C 11/006* (2013.01); *A01M 29/12* (2013.01); *A01M 2200/012* (2013.01); *B65C 2210/0078* (2013.01); *B65C 2210/0089* (2013.01); *B65C 2210/0094* (2013.01)

(58) Field of Classification Search
CPC .......... B65C 11/006; B65C 2210/0078; B65C 2210/0089; B65C 2210/0094; A01M 29/12; A01M 2200/012
USPC ................... 156/60, 64, 350, 351, 378, 379
See application file for complete search history.

(56) References Cited

U.S. PATENT DOCUMENTS

| | | | | |
|---|---|---|---|---|
| 5,795,085 A | * | 8/1998 | Yoo | B65H 37/007 156/577 |
| 2025/0282515 A1 | * | 9/2025 | Wang | B65H 35/002 |

* cited by examiner

*Primary Examiner* — Michael N Orlando
*Assistant Examiner* — Joshel Rivera

(57) ABSTRACT

A sticker machine, for peeling a sticker from a liner paper during a conveying process of the sticker. The sticker machine includes a turning peeling portion, configured to cause the sticker to be peeled from the liner paper by conveying the liner paper in a direction different from a travel direction of the sticker; and a sticker guiding portion, configured to guide the sticker to be conveyed in a pre-scribed direction to the turning peeling portion, for causing the sticker after being peeled to enter an output port. In a conveying direction of the sticker, the sticker guiding portion is disposed at a position further upstream than the turning peeling portion.

15 Claims, 19 Drawing Sheets

STICKER MACHINE

CROSS REFERENCE

The present application is a continuation-application of International (PCT) Patent Application No. PCT/CN2024/ 087384, filed on Apr. 12, 2024, which claims priorities of Chinese Patent Applications No. 202322073984.3 filed on Aug. 3, 2023, No. 202322074062.4 filed on Aug. 3, 2023, No. 202320986078.X filed on Apr. 24, 2023, No. 202321007280.X filed on Apr. 24, 2023, No. 202322189130.1 filed on Aug. 15, 2023, No. 202322189177.8 filed on Aug. 15, 2023, No. 202322843296.0 filed on Oct. 23, 2023, and No. 202420070955.3 filed on Jan. 11, 2024, the entire contents of which are hereby incorporated by reference in their entirety.

TECHNICAL FIELD

The present disclosure relates to the technical field of stationery products, and more specifically to a sticker machine.

BACKGROUND

Stickers have a wide range of applications. The sticker includes an adhesive surface and a printing surface, where the adhesive surface has an adhesive, and the printing surface is pre-printed with text, symbols, or patterns, etc. The sticker is peelably disposed on a liner paper before use, and the sticker can be peeled off from the liner paper and then affixed to a surface of an object when in use.

In order to facilitate dispensing the sticker, the related art provides a variety of solutions for peeling the sticker from the liner paper. For example, Chinese patent application with Publication No. CN2280699Y and U.S. patent application with Publication No. U.S. Pat. No. 5,770,008A disclose a push-type sticker dispenser, where a friction wheel is actuated by manually pressing a rack, and the friction wheel moves a strip by friction to dispense the sticker. Another related art, such as Japanese patent application with Publication No. JP1998058764A, is to print and dispense tags by driving a feed roller by a motor and moving a strip by friction of the feed roller. The related art is complex in structure as the strip is moved by friction.

Further another related art, such as Chinese patent application with Publication No. CN216003626U, realizes the peeling of the sticker by pulling a strip in different directions along an extension direction of a pulling outlet. However, Applicant of the present disclosure found that the strip is in a relatively loose state during the pulling process and may be bent and deformed, such that the peeling effect of the sticker is worse and not ensured. Further, the direction of the peeled off sticker varies a lot, and sometimes the sticker can't even have an end out of the pulling outlet.

In view of this, it is necessary to propose a new technical program to overcome the deficiencies of the related art.

SUMMARY OF THE DISCLOSURE

The technical problem to be solved by the present disclosure is to overcome the above-mentioned deficiencies of the related art, and provide a sticker machine, which facilitates the peeling and output of stickers.

In order to achieve the above objectives, the technical solutions adopted in the present disclosure are as follows.

A sticker machine, for peeling a sticker from a liner paper during a conveying process of the sticker, including:

a turning peeling portion, configured to cause the sticker to be peeled from the liner paper by conveying the liner paper in a direction different from a travel direction of the sticker; and a sticker guiding portion, configured to guide the sticker to be conveyed in a prescribed direction to the turning peeling portion, for causing the sticker after being peeled to enter an output port;

wherein in a conveying direction of the sticker, the sticker guiding portion is disposed at a position further upstream than the turning peeling portion.

In some embodiments, the sticker guiding portion includes a limiting portion disposed on a side of the liner paper adhering to the sticker, for limiting the liner paper from bending and deforming.

In some embodiments, the limiting portion is arranged with a plurality of protrusions protruding towards the liner paper, and the plurality of protrusions are configured to abut against the liner paper to increase a conveying resistance.

In some embodiments, the sticker guiding portion further includes a carrying portion disposed on a side of the liner paper not adhering to the sticker, for carrying the liner paper during a conveying process of the liner paper; a sticker conveying channel is defined between the carrying portion and the limiting portion.

In some embodiments, the sticker machine further includes a liner guiding portion; wherein the liner guiding portion is configured to guide the liner paper to be conveyed in a prescribed direction, for increasing a bending angle formed by the liner paper at the turning peeling portion.

In some embodiments, a liner guide gap is defined between the liner guiding portion and the turning peeling portion for the liner paper to pass through after the sticker is peeled off.

In some embodiments, the liner guiding portion includes a peeling blade configured to peel off the sticker that is still adhered to the liner paper after passing through the turning peeling portion.

In some embodiments, in the conveying direction of the sticker, an upper surface of the turning peeling portion extends at an incline in a direction away from the liner guiding portion.

In some embodiments, the sticker machine further includes a housing; wherein the turning peeling portion, the sticker guiding portion, and the liner guiding portion are integrally molded to the housing.

In some embodiments, the housing defines a sticker compartment; the liner paper, in a form of a long strip, adhering to the sticker is wound into a roll or folded into a laminated form, and placed in the sticker compartment.

In some embodiments, the sticker machine further includes:

a housing, defining a sticker compartment for receiving a sticker roll and the output port;

a winding shaft, capable of winding the liner paper to convey the sticker to the output port; and a motor, configured to output rotational power and in transmission-connection with the winding shaft;

wherein the motor is at least partially disposed within the sticker compartment and is adapted to be threaded into a central positioning hole in the sticker roll.

In some embodiments, the housing includes an envelope extending into the sticker compartment, and the motor is at least partially disposed within the envelope.

In some embodiments, the envelope is capable of being threaded into the central positioning hole to be adapted to locate the sticker roll.

In some embodiments, the envelope is arranged with an avoidance portion, and the avoidance portion is capable of being defining a pick-up space between the avoidance portion and a wall of the central positioning hole, the sticker roll being suitable for being held and removed from the pick-up space.

In some embodiments, the motor is arranged with a positioning portion corresponding to the avoidance portion, the positioning portion cooperating with the avoidance portion to allow the motor and the envelope to be positioned relative to each other in a circumferential direction.

In some embodiments, the sticker machine further includes:

a photoelectric device, configured to obtain output information of the sticker according to a photoelectric signal and disposed close to the output port; and a shading portion, configured to block an external light from being incident on the photoelectric device through the output port and to prevent the external light from interfering with the photoelectric signal.

In some embodiments, the shading portion is formed on an edge of the output port and extends from the output port towards the photoelectric device.

In some embodiments, a surface of the shading portion opposite to an adhesive surface of the sticker is arranged with an anti-adhesive portion, and the anti-adhesive portion is a convex rib or bump, a top of the convex rib or bump having an edge.

In some embodiments, the sticker is a mosquito repellent sticker capable of emitting a mosquito repellent odor, and the sticker machine further includes:

an airtight device, capable of separably sealing and closing the output port, for preventing the mosquito repellent odor from escaping from the output port in condition of the sticker machine being in a non-operational state.

In some embodiments, the airtight device includes a plug portion inserted into the output port and a cover portion connected to the plug portion, the cover portion covering an outside of the output port.

In some embodiments, the airtight device further includes a connection portion; the connection portion is configured, such that the airtight device is capable of being attached to the sticker machine by means of the connection portion in condition of the airtight device being separated from the output port.

In some embodiments, the sticker machine further includes:

a housing;

a winding shaft, capable of winding the liner paper to convey the sticker to the output port;

an operating member, configured to operatively reciprocate within a set range; and a transmission mechanism, transmission-connected to the operating member and the winding shaft, and capable of transmitting power output from the operating member to the winding shaft to drive the winding shaft to rotate;

wherein the transmission mechanism includes a one-way clutching device; the one-way clutching device is configured to be coupled in condition of the operating member moving in the first direction to implement a transmission of the power, and to be uncoupled in condition of the operating member moving in the second direction opposite to the first direction to disconnect the transmission of the power.

In some embodiments, the transmission mechanism is a gear train transmission mechanism including a plurality of gears coupled to each other; the one-way clutching device includes:

a movable gear, movable between a coupled position and a detached position; and a force applying member, configured to apply a resilient force to the movable gear in a direction such that the movable gear remains in the coupled position;

wherein in condition of the operating member moving in the second direction, the movable gear is capable of overcoming the resilient force to move from the coupled position to the detached position.

In some embodiments, the transmission mechanism is a gear train transmission mechanism including a plurality of gears coupled to each other; the one-way clutching device includes:

a movable gear, movable between a coupled position and a detached position; and a force applying member, configured to apply a resilient force to the movable gear in a direction such that the movable gear remains in the detached position;

wherein in condition of the operating member moving in the first direction, the movable gear is capable of overcoming the resilient force to move from the detached position to the coupled position.

In some embodiments, the transmission mechanism further includes:

an actuating gear, disposed upstream of and remaining coupled to the movable gear in a transmission direction of the power; and a driven gear, disposed downstream of and detachably coupled to the movable gear in the transmission direction of the power;

wherein in condition of the operating member moving in the second direction, the actuating gear acts on the movable gear in a direction such that the movable gear is separated from the driven gear.

As a result of the above technical solutions, the present disclosure has the following beneficial effects.

The sticker machine provided in the present disclosure includes a turning peeling portion and a sticker guiding portion, where the sticker guiding portion is disposed at a position further upstream than the turning peeling portion in a conveying direction of the sticker, and the sticker guiding portion is configured to guide the sticker to be conveyed to the turning peeling portion in a prescribed direction, so as to cause the peeled sticker into the output port. As the sticker conveyed to the turning peeling portion is guided by the sticker guiding portion, the sticker is made to travel in the prescribed direction, such that the peeled sticker is able to enter the set output port, thereby facilitating the peeling and output of the sticker.

BRIEF DESCRIPTION OF THE DRAWINGS

To more clearly illustrate the technical solutions of the embodiments of the present disclosure, the accompanying drawings of the embodiments will be briefly described below, and it will be apparent that the accompanying drawings in the following description relate only to some embodiments of the present disclosure and are not a limitation of the present disclosure.

Figure 1:
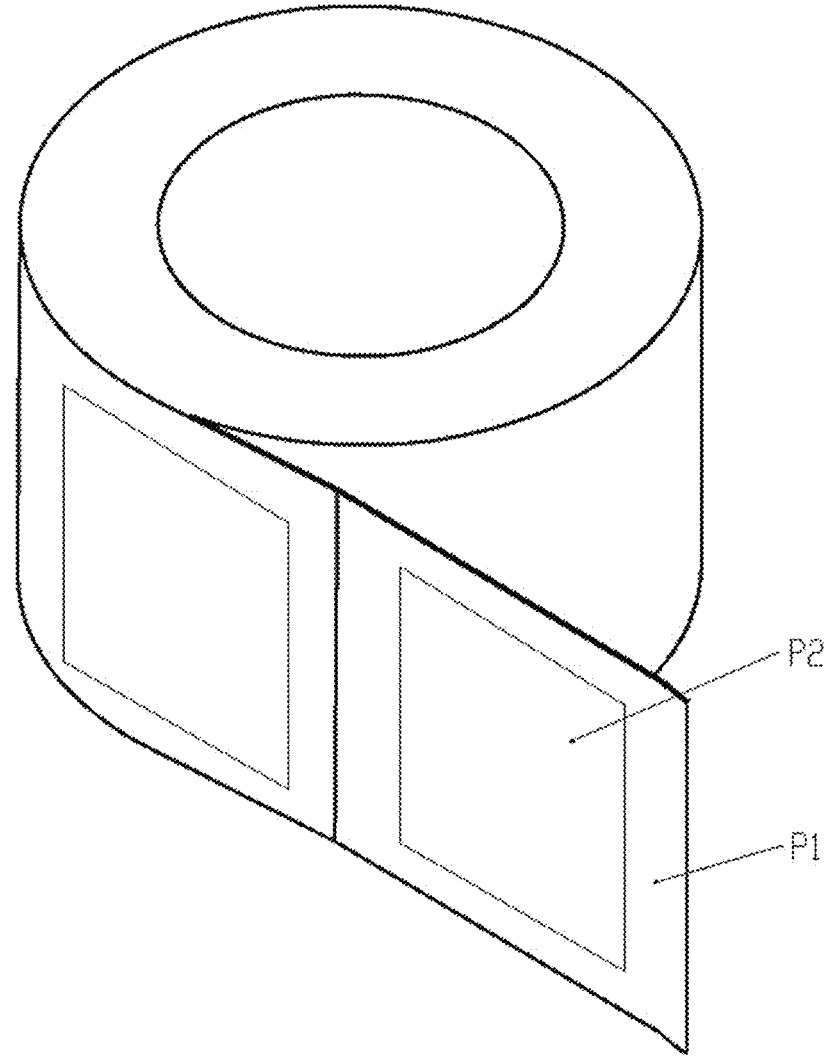
FIG. 1 is a schematic view of a sticker roll.
Figure 2:
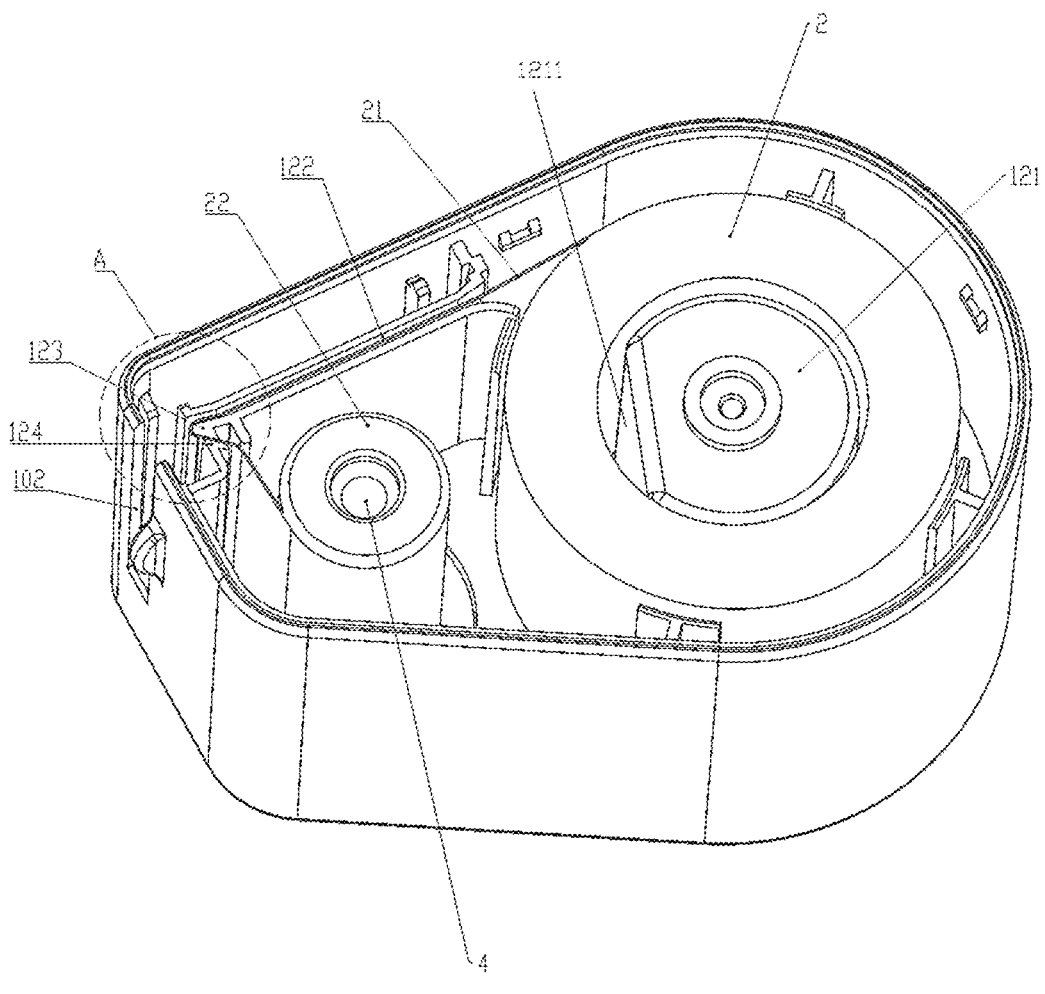
FIG. 2 is a perspective view of an internal structure of a sticker machine, in cooperation with a sticker roll, according to some embodiments of the present disclosure.
Figure 3:
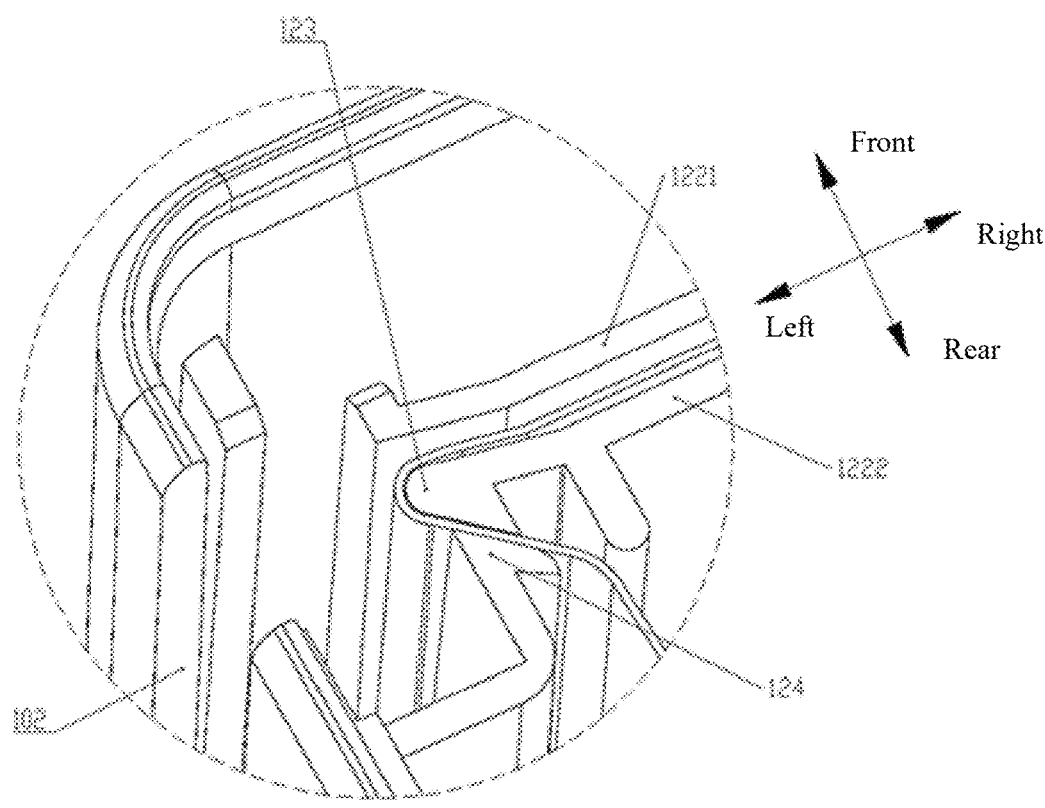
FIG. 3 is a partially enlarged view of area A in FIG. 2.

| \multicolumn{6}{c}{Reference numerals} | | | | | |
|---|---|---|---|---|---|
| No. | Name | No. | Name | No. | Name |
| p1 | liner paper | 1211 | Pick-up space | 53 | third gear |
| p2 | sticker | 1220 | sticker conveying channel | 54 | fourth gear |
| 100 | sticker machine | 1221 | limiting portion | 521 | second gear shaft |
| 101 | sticker compartment | 1222 | carrying portion | 531 | third gear shaft |
| 102 | output port | 1240 | liner guide gap | 541 | fourth gear shaft |
| 1 | housing | 1241 | peeling blade | 61 | power switch |
| 11 | upper cover | 2 | sticker roll | 62 | start-up assembly |
| 121 | envelope | 20 | sticker box | 7 | airtight device |
| 122 | sticker guiding portion | 21 | conveying portion | 71 | plug portion |
| 123 | turning peeling portion | 22 | liner roll | 72 | cover portion |
| 124 | liner guiding portion | 23 | box body | 73 | connection portion |
| 12 | seat body | 24 | box lid | 8 | operating member |
| 13 | lower cover | 201 | center positioning hole | 801 | rack portion |
| 131 | guide slot | 3 | motor | 81 | actuating gear |
| 14 | cover plate | 31 | photoelectric device | 82 | movable gear |
| 140 | avoidance hole | 4 | winding shaft | 811, 821 | small-diameter wheel |
| 1021 | upper edge | 41 | sleeve portion | 812, 822 | large-diameter wheel |
| 1022 | lower edge | 5 | transmission mechanism | 83 | driven gear |
| 1023 | shading portion | 51 | first gear | 84 | reset spring |
| 1024 | anti-adhesive portion | 52 | second gear | 85 | resilient member |

Figure 6:
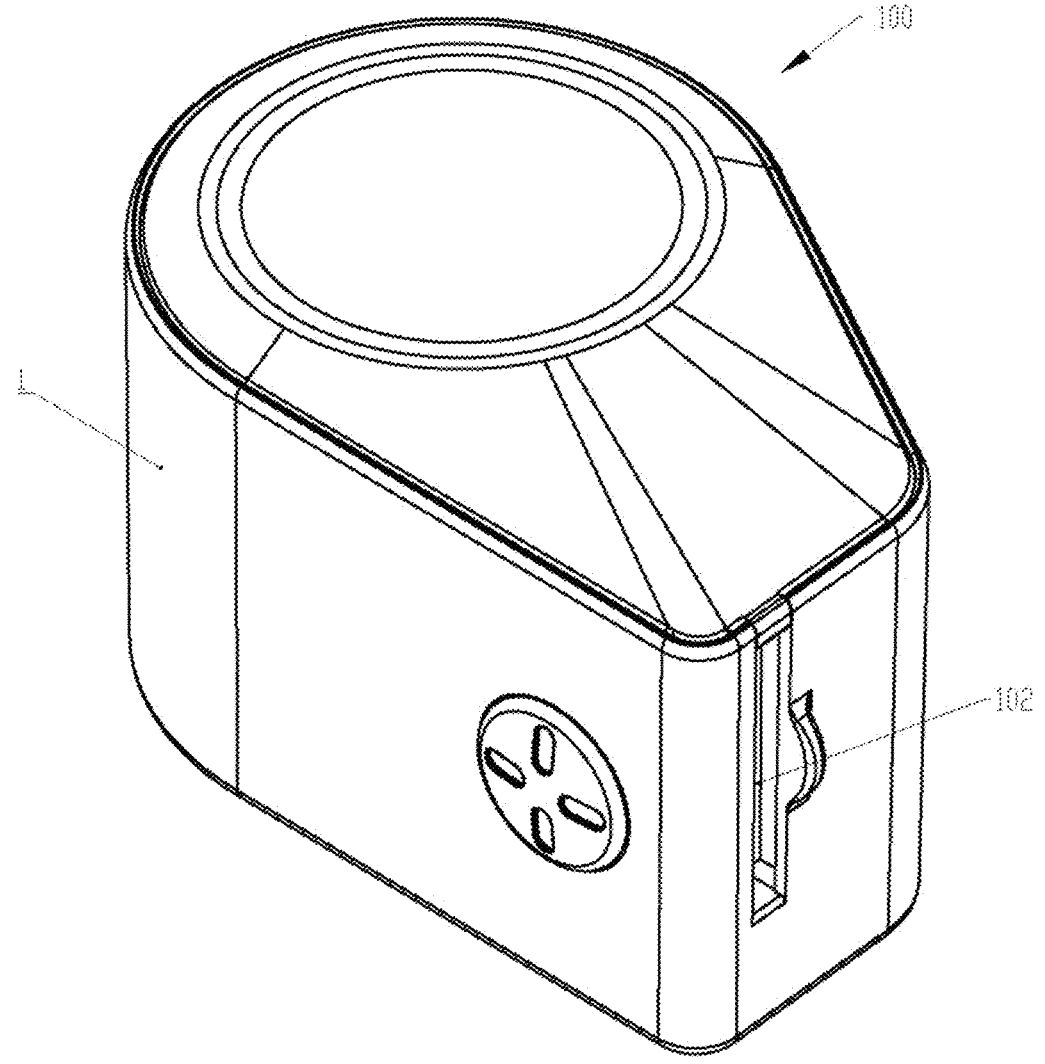
FIG. 6 is a perspective assembled view of a sticker machine according to some embodiments of the present disclosure.
Figure 7:
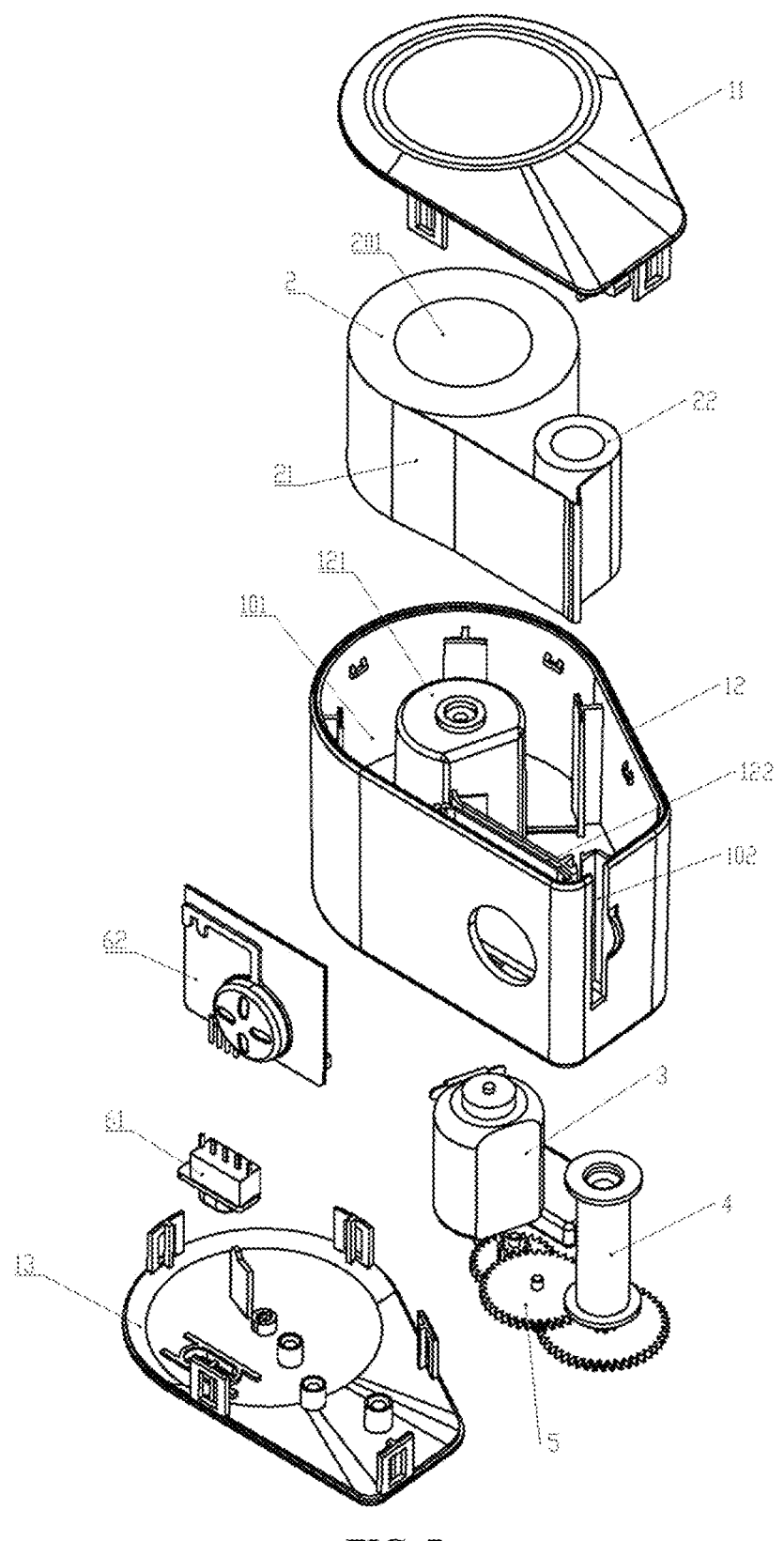

FIG. 7 is a perspective exploded view of the sticker machine shown in FIG. 6.

Figure 8:
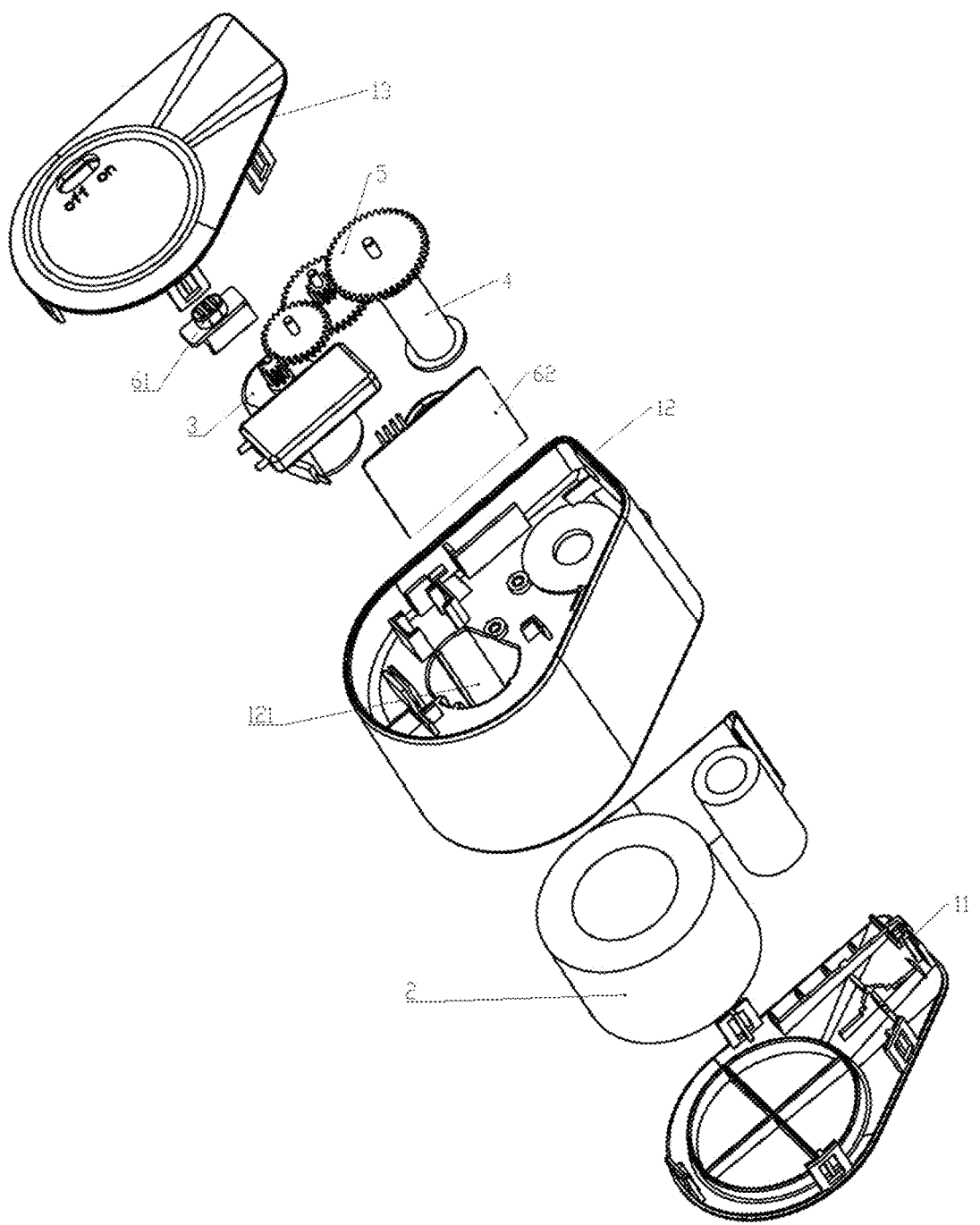

FIG. 8 is a perspective exploded view of the sticker machine shown in FIG. 6 at another viewing angle.

Figure 9:
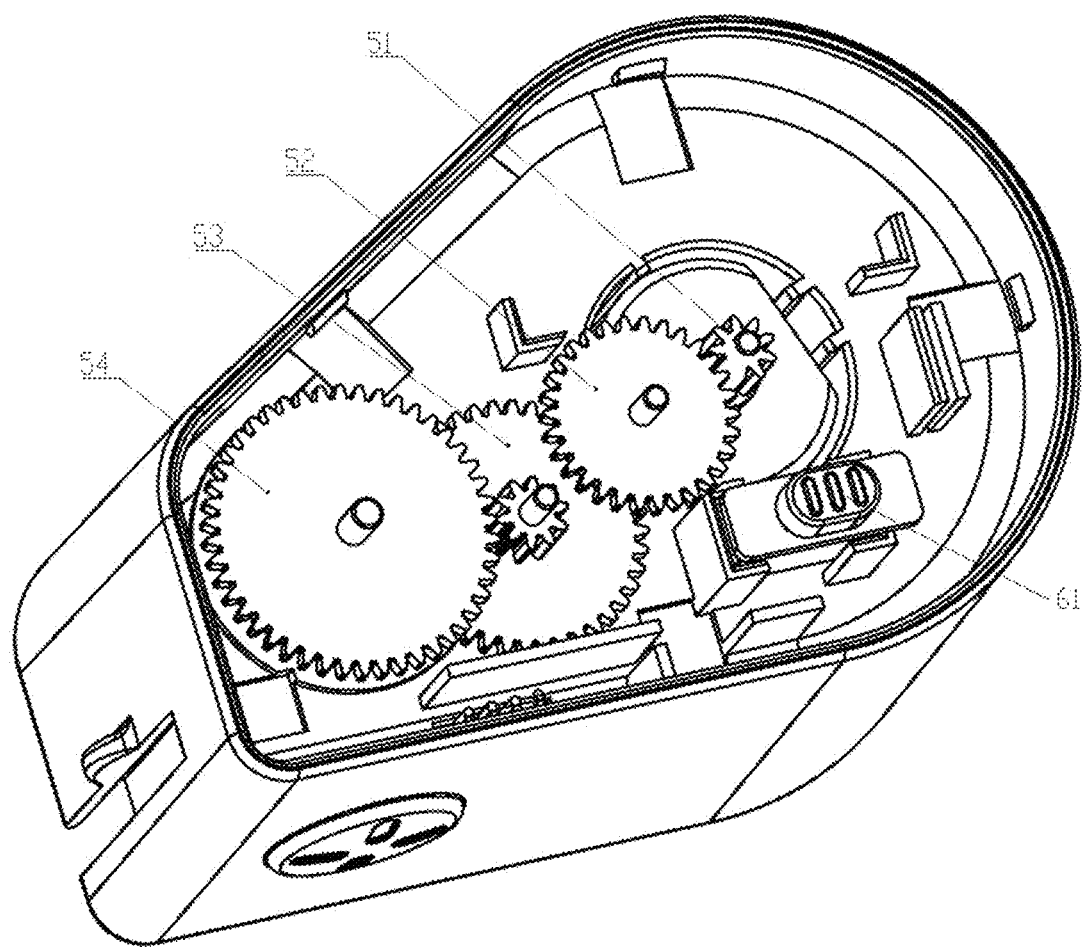

FIG. 9 is a perspective view of the sticker machine shown in FIG. 6 with a lower cover removed.

Figure 10:
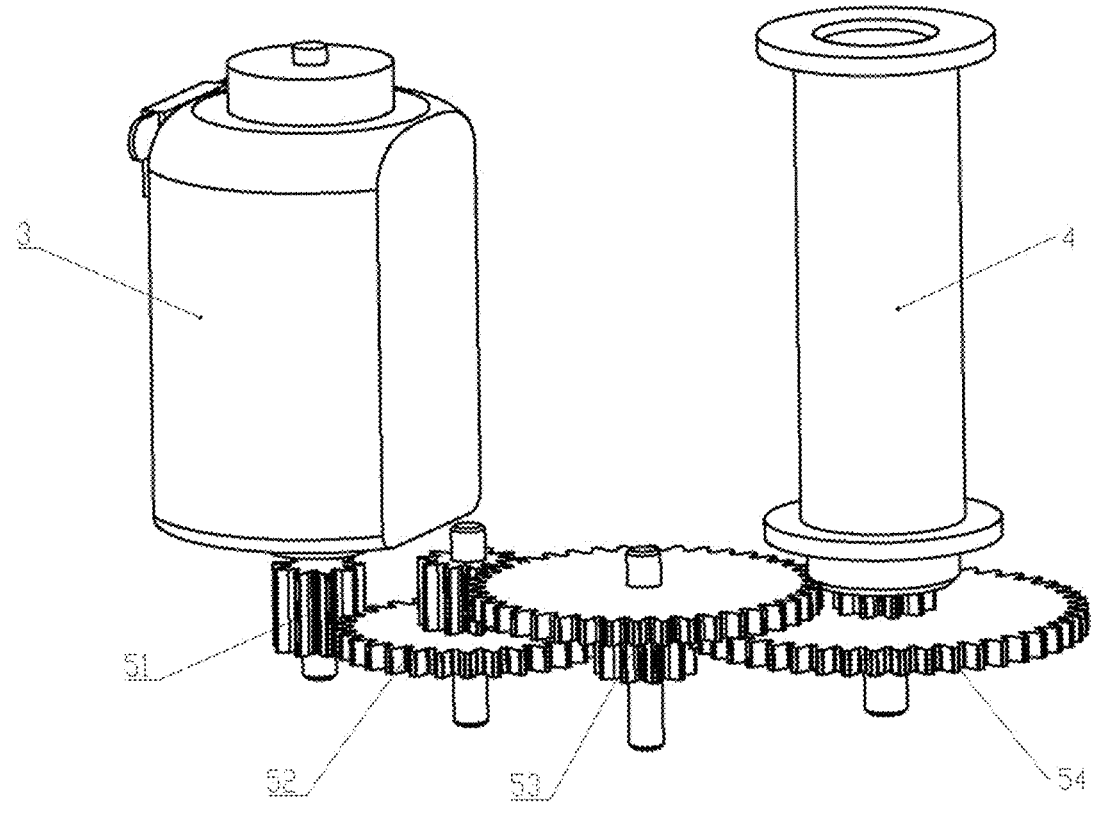

FIG. 10 is a perspective assembled view of a motor, a transmission mechanism, and a winding shaft of the sticker machine shown in FIG. 6.

Figure 11:
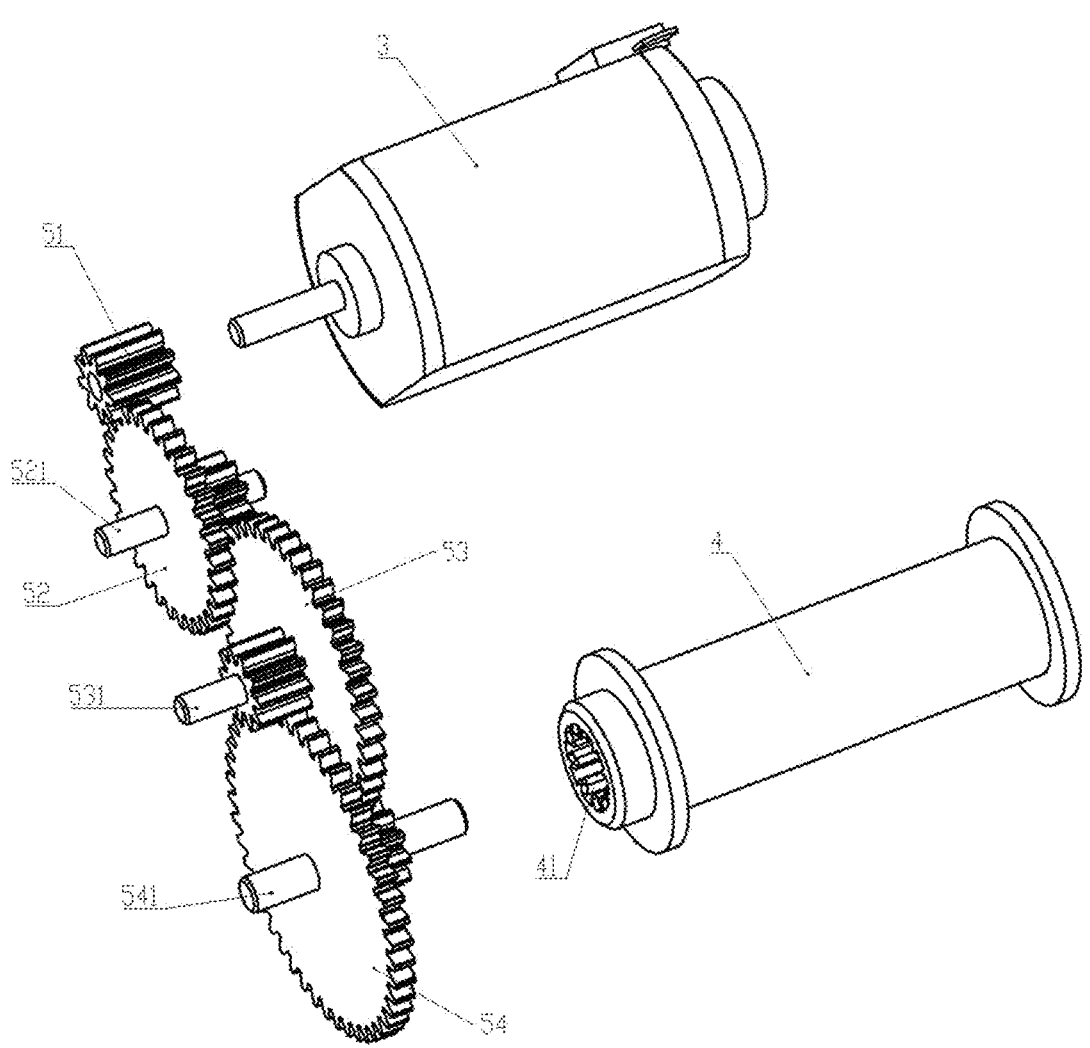

FIG. 11 is a perspective exploded view of a motor, a transmission mechanism, and a winding shaft of the sticker machine shown in FIG. 6.

Figure 12:
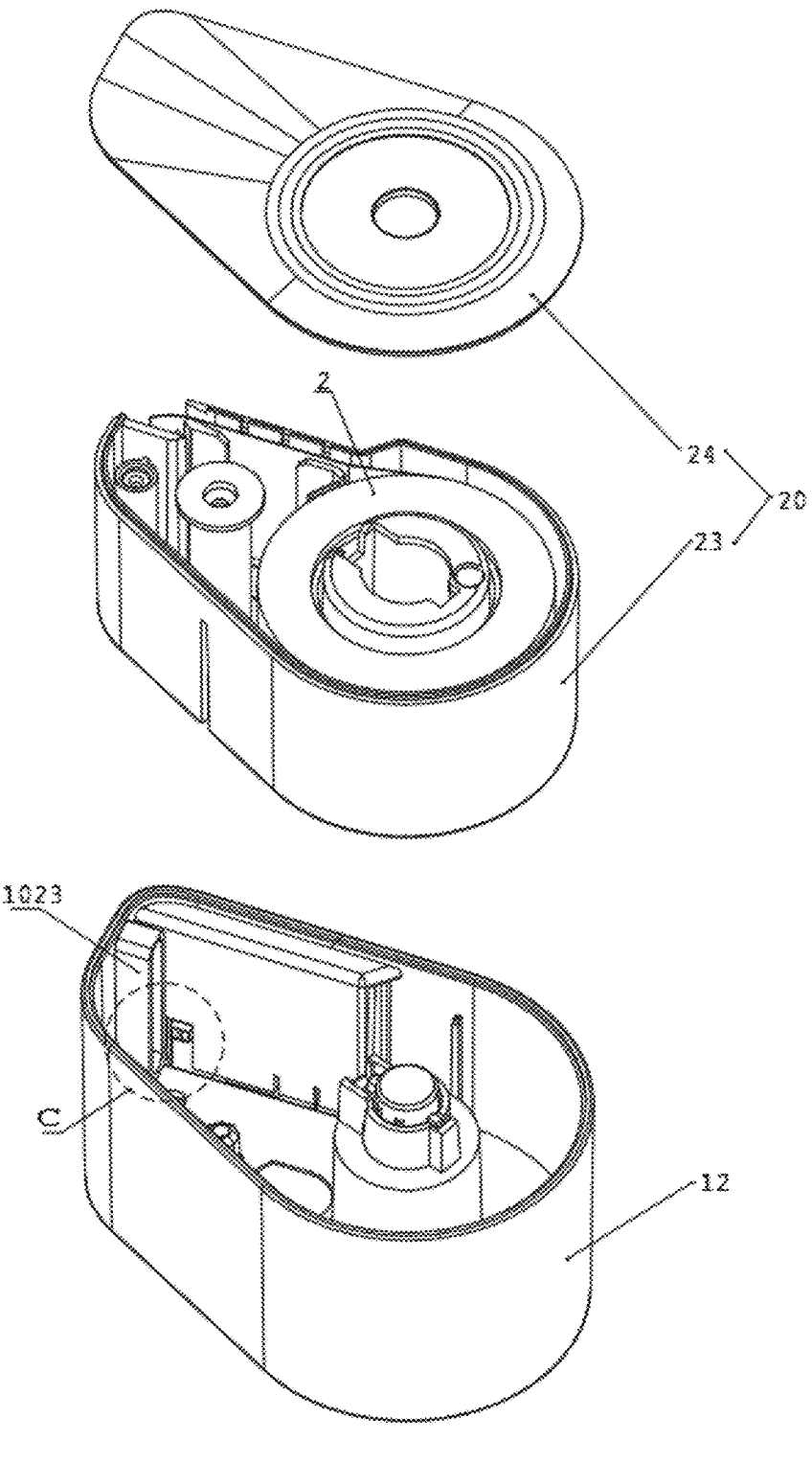

FIG. 12 is a perspective exploded view of a sticker machine according to other embodiments of the present disclosure.

Figure 13:
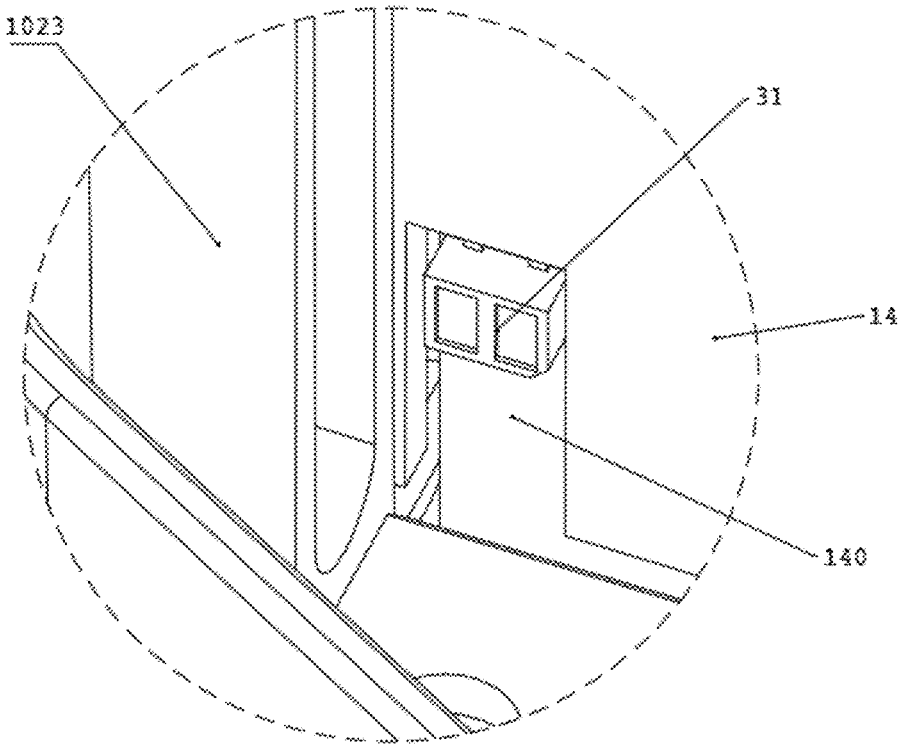

FIG. 13 is a partially enlarged view of area C in FIG. 12.

Figure 14:
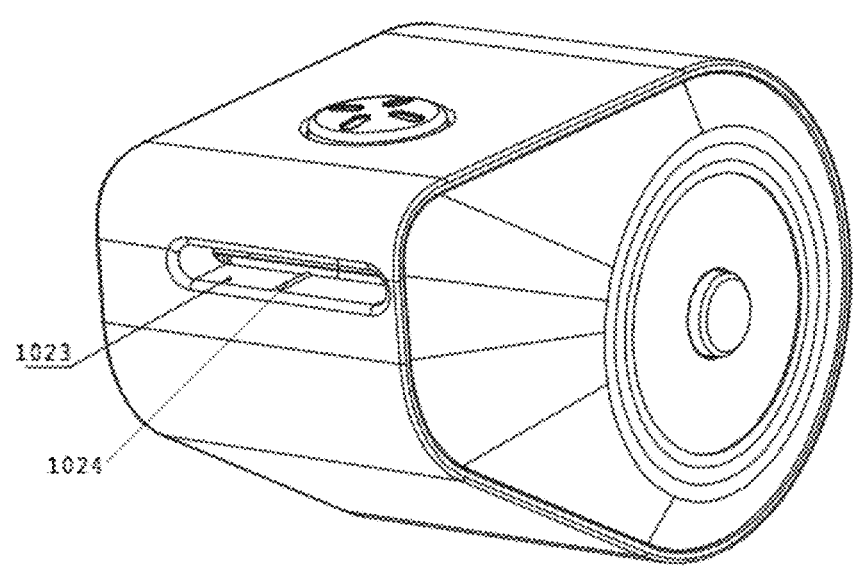

FIG. 14 is a perspective assembled view of the sticker machine shown in FIG. 12.

Figure 15:
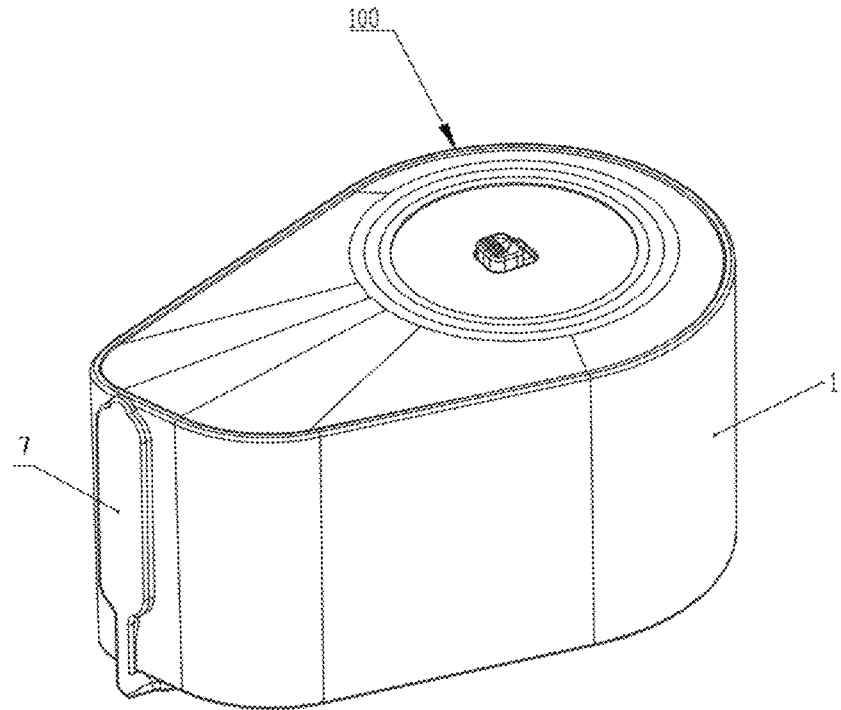

FIG. 15 is a perspective assembled view of a sticker machine according to further other embodiments of the present disclosure.

Figure 16:
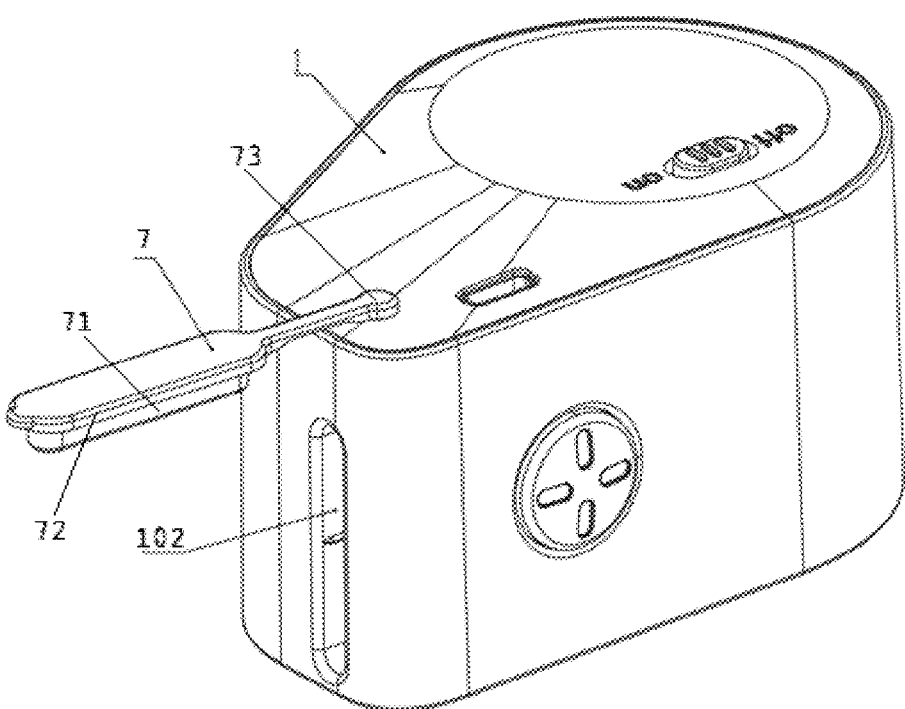

FIG. 16 is a perspective exploded view of the sticker machine shown in FIG. 15.

Figure 17:
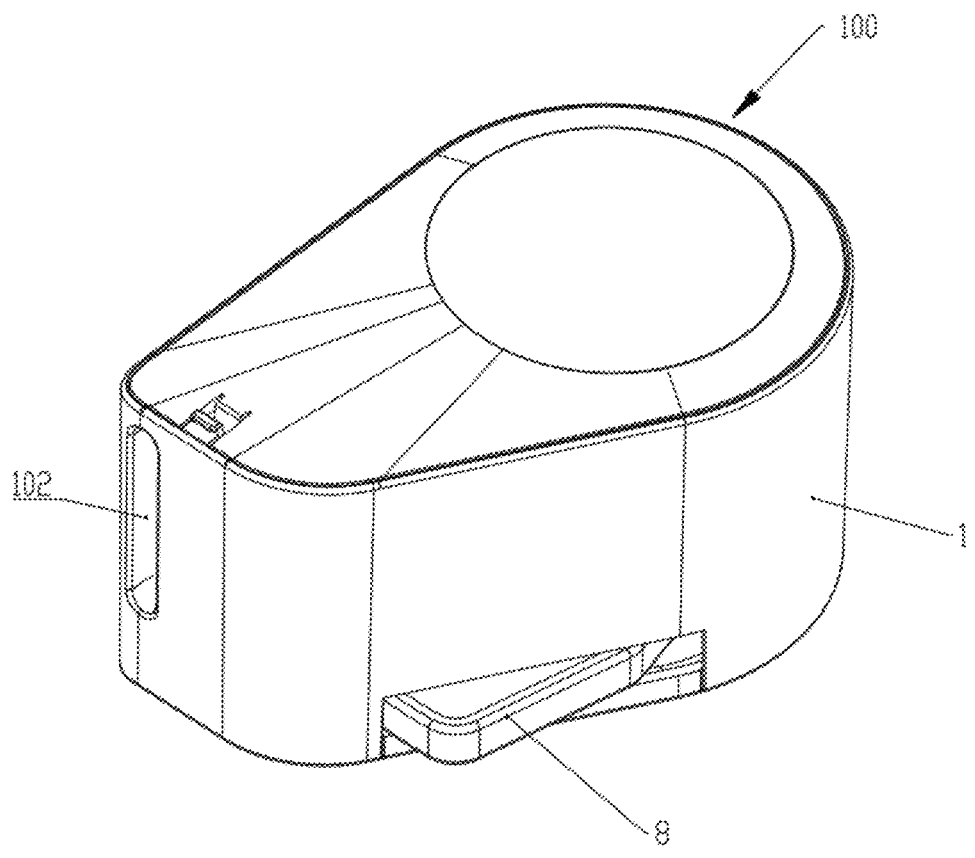

FIG. 17 is a perspective assembled view of a sticker machine according to yet other embodiments of the present disclosure.

Figure 18:
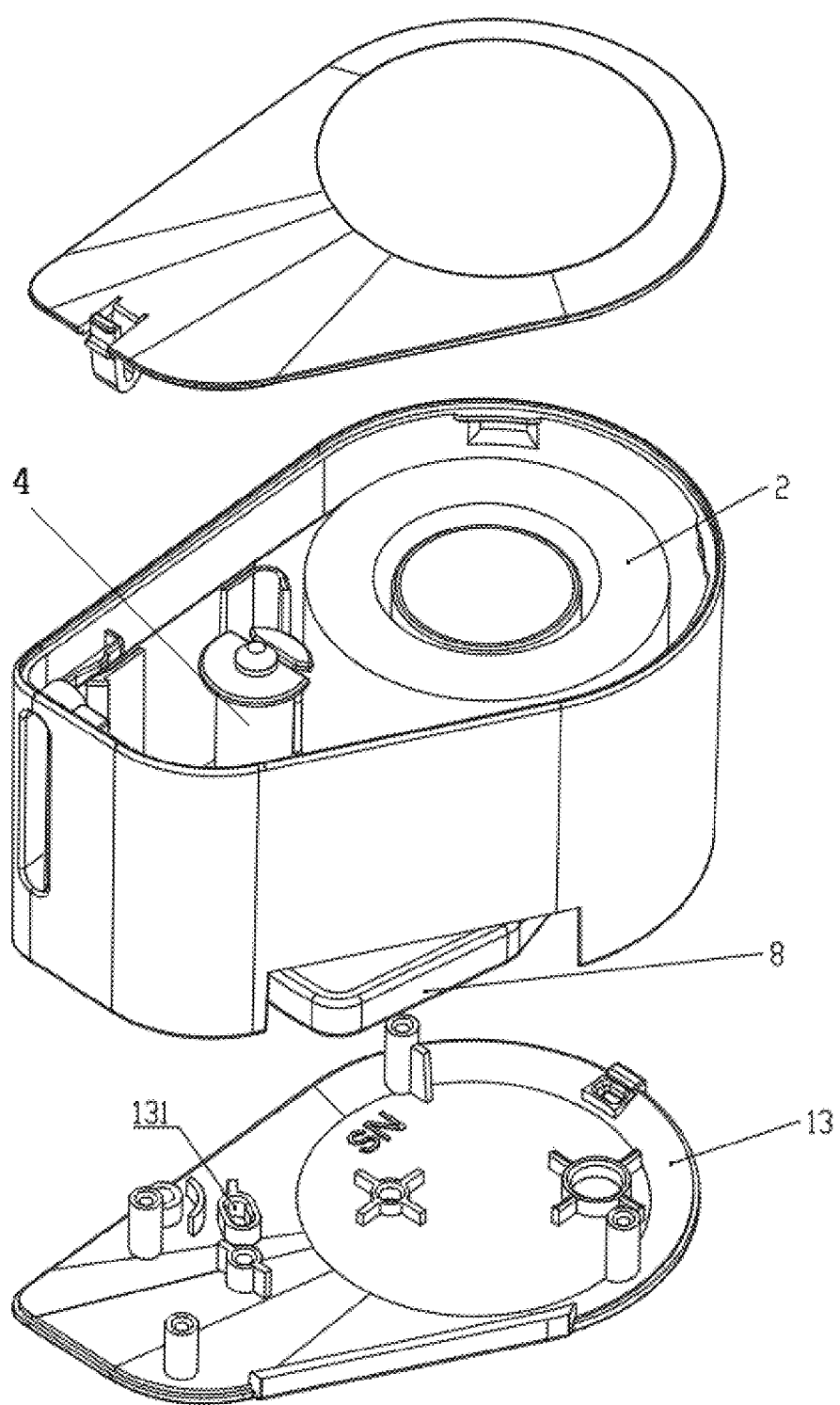
Figure 19:
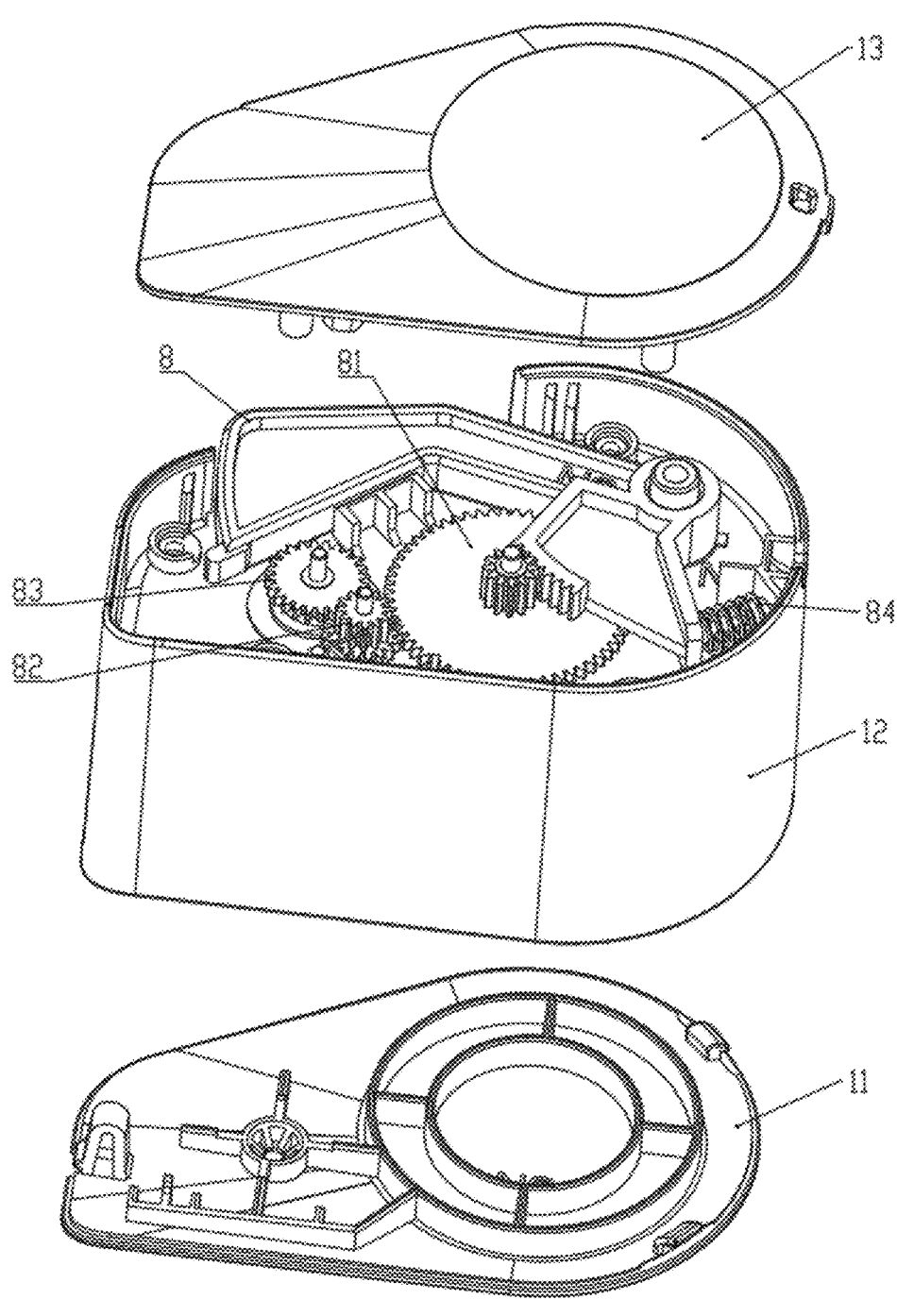
FIG. 19 is a perspective exploded view of the sticker machine shown in FIG. 17 at another viewing angle.
Figure 20:
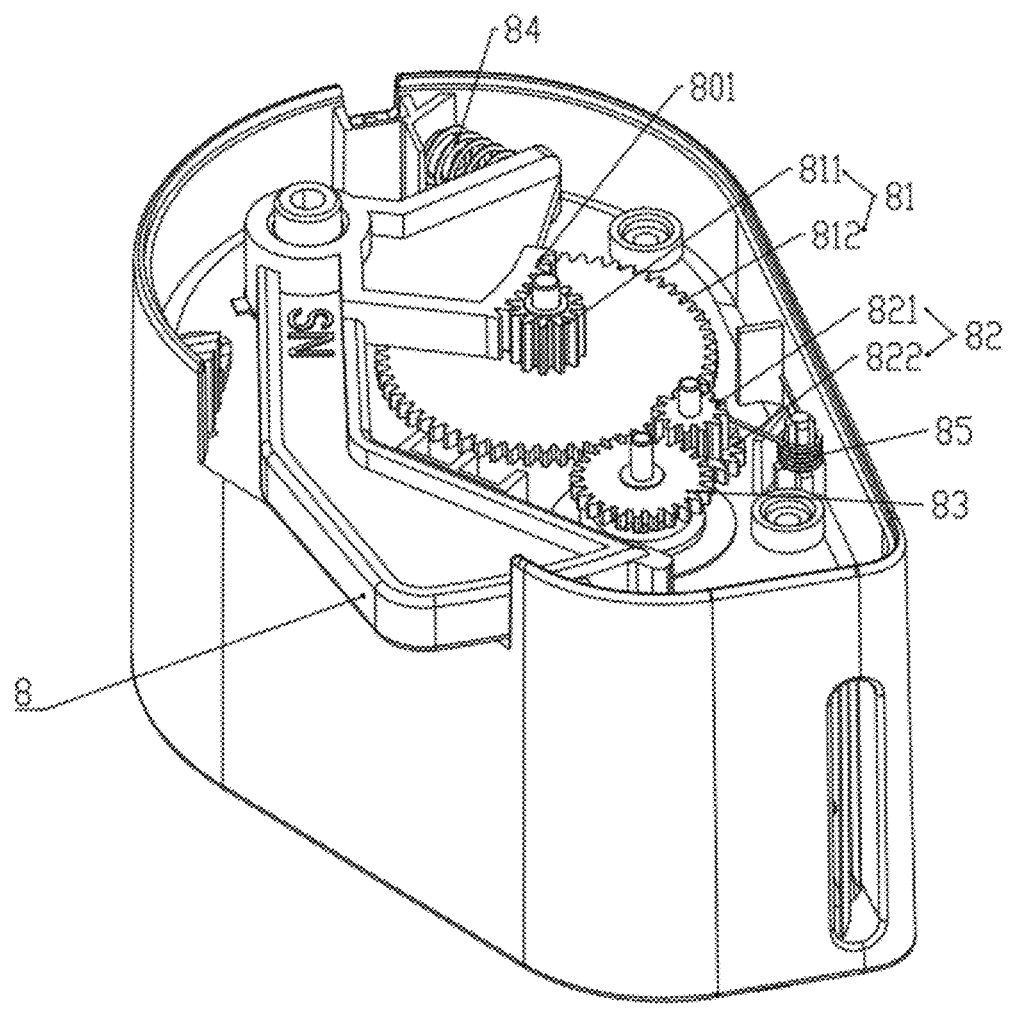
FIG. 20 is a perspective assembled view of the sticker machine shown in FIG. 17 showing an operating member and a transmission mechanism.

FIG. 18 is a perspective exploded view of the sticker machine shown in FIG. 17.

DETAILED DESCRIPTION

To make the purpose, technical solutions, and advantages of the embodiments of the present disclosure clearer, the present disclosure will be described in further detail below in conjunction with the accompanying drawings. The components in the embodiments of the present disclosure generally described and illustrated in the accompanying drawings herein may be arranged and designed in a variety of different configurations. Based on the embodiments in the present disclosure, all other embodiments obtained by those skilled in the art without creative labor are within the scope of the present disclosure.

It should be noted that similar symbols and letters denote similar items in the following accompanying drawings, and therefore, once an item is defined in an accompanying drawing, it is not required to be further defined and explained in subsequent accompanying drawings.

Unless otherwise defined, technical terms or scientific terms used in the present disclosure shall have the ordinary meaning understood by those skilled in the art. The terms "first", "second", etc. used in the specification and in the claims of the present disclosure do not indicate any order, number, or importance, but are only intended to distinguish between different components. Similarly, the terms "a", "one", or "the", etc. do not indicate a limitation of number, but rather the presence of at least one. The terms such as "include" or "contain" mean that the element or object appearing before the "include" or "contain" covers the element or object listed after the "include" or "include", and do not exclude other elements or objects. The terms of "center", "up", "down", "left", "right", "vertical", "horizontal", "inside", "outside", etc. are only intended to indicate a relative positional relationship, and when the absolute position of the described object is changed, the relative positional relationship may also be changed accordingly, which is only for the purpose of facilitating the description of the present disclosure and simplifying the description, and is not intended to indicate or imply that the device or element referred to must have a particular orientation, be constructed and operated in a particular orientation, and therefore cannot be construed as a limitation of the present disclosure.

In the description of the present disclosure, it is to be noted that, unless otherwise expressly provided and limited, the terms "mounted", "connected", and "coupled" are to be understood in a broad sense. For example, it may be a fixed connection, a removable connection, or a connection in one piece; it may be a mechanical connection or an electrical connection; it may be a direct connection or an indirect connection through an intermediate medium; and it may be a connection within the two elements. For those skilled in the art, the specific meaning of the above terms in the present disclosure can be understood in specific cases.

Some embodiments of the present disclosure are described in detail below in conjunction with the accompanying drawings. The features in the following embodiments may be combined with each other without conflict.

Embodiment I

Referring to FIGS. 1 to 11, the present disclosure provides a sticker machine 100 for peeling a sticker off a liner paper during a sticker conveying process. The sticker adhered to the liner paper may be wound to form a sticker roll 2 as shown in FIG. 11, or meandered and folded into a laminated sticker stack. The sticker P2 is peelably adhered to the liner paper P1. A side of the sticker P2 back away from the liner paper P1 may be printed with a pattern, text, QR code, barcode, etc. for children's entertainment or for use as a label identification. The sticker machine 100 can peel the sticker P2 from the liner paper P1 during the conveying process of the sticker P2 and output the sticker P2 from an output port 102.

Referring to FIGS. 1 to 5, the sticker machine 100 includes a turning peeling portion 123 and a sticker guiding portion 122. The turning peeling portion 123 is configured to cause the sticker P2 to be peeled from the liner paper P1 by conveying the liner paper P1 in a direction different from a travel direction of the sticker P2. The sticker guiding portion 122 is configured to guide the sticker P2 to be conveyed in a prescribed direction to the turning peeling portion 123, so as to cause the peeled sticker P2 to enter the output port 102. In the conveying direction of the sticker P2, the sticker guiding portion 122 is disposed at a position further upstream than the turning peeling portion 123.

As the sticker P2 conveyed to the turning peeling portion 123 is guided by the sticker guiding portion 122, the sticker P2 is made to travel in the prescribed direction, such that the peeled sticker P2 is able to enter into the output port 102, thereby facilitating the peeling and output of the sticker P2.

Further, the sticker guiding portion 122 includes a limiting portion 1221, the limiting portion 1221 being disposed on a side of the liner paper P1 adhering to the sticker P2, so as to limit a bending deformation amount of the liner paper P1 before being conveyed to the turning peeling portion 123, thereby ensuring that the liner paper P1 is relatively flat and tensioned when being conveyed to the turning peeling portion 123, and thus facilitating the sticker P2 being peeled off at the turning peeling portion 123. In some embodiments, the limiting portion 1221 is arranged with multiple protrusions towards the liner paper P1, the protrusions being configured to abut against the liner paper P1 to increase a conveying resistance, which further enables the liner paper P1 to be tensioned. The sticker guiding portion 122 further includes a carrying portion 1222 disposed on a side of the liner paper P1 not adhering to the sticker P2, so as to carry the liner paper P1 during the conveying process of the liner paper P1. Specifically, the liner paper P1 may slide in contact with the carrying portion 1222 when being pulled and tensioned. The carrying portion 1222 is typically disposed on a side close to the sticker roll 2 or the sticker stack. The limiting portion 1221 is disposed on the side of the liner paper P1 adhering to the sticker P2, the limiting portion 1221 is configured to limit the liner paper P1 from generating bending deformations, and the limiting portion 1221 is typically disposed on a side away from the sticker roll 2 or the sticker stack. Further, the limiting portion 1221 and carrying portion 1222 are each a plate body, and a sticker conveying channel 1220 is defined between the carrying portion 1222 and the limiting portion 1221. The sticker conveying channel 1220 enables the liner paper P1 adhered to the sticker P2 to be conveyed in a flat manner, thereby avoiding the sticker P2 being peeled off due to the bending of the liner paper P1 before conveyed to the output port 102. The sticker conveying channel 1220 being configured to limit the liner paper P1 from generating bending deformations does not only include conveying flatly as described above, but may further include limiting the liner paper P1 to generate deformations with less curvature. For example, the sticker conveying channel 1220 is a curved channel with less curvature, where the curvature is set in such a way as not to cause the sticker P2 to be peeled off from the liner paper P1. It should be noted that the sticker conveying channel 1220 is constructed in a way as long as a paper strip formed by the liner paper P1 and the sticker P2 can pass through. In other embodiments, the carrying portion 1222 and the limiting portion 1221 may each be implemented as multiple side-by-side arranged roll structures, rib structures, etc.

Referring to FIGS. 1 to 5, the sticker machine 100 further includes a liner guiding portion 124, the liner guiding portion 124 being configured to guide the liner paper P1 with the sticker P2 peeled off to be conveyed in a prescribed direction, so as to increase the bending angle formed by the liner paper P1 at the turning peeling portion 123. In the conveying direction of the liner paper P1, the liner paper guiding portion 124 is disposed at a position further downstream than the turning peeling portion 123. A liner guide gap 1240 is defined between the liner guiding portion 124 and the turning peeling portion 123 for the liner paper P1 to pass through after the sticker P2 being peeled off. The liner guiding portion 124 has a guiding bevel, with a peeling blade 1241 being formed on a tip of the guiding bevel, and the peeling blade 1241 is capable of peeling off the sticker P2 which is still adhered to the liner paper P1 after passing through the turning peeling portion 123. The sticker machine 100 is arranged with the output port 102, the output port 102 having an upper edge 1021 and a lower edge 1022. An upper surface of the turning peeling portion 123 is not higher than the upper edge 1021 of the output port 102, and the peeling blade 1241 is not lower than the lower edge 1022 of the output port 102. Such a setting makes it possible for both the sticker P2 that is peeled off once by the turning peeling portion 123, and for the sticker P2 that is peeled off assisted by the liner guiding portion 124, to smoothly enter the output port 102 for output.

Figure 4:
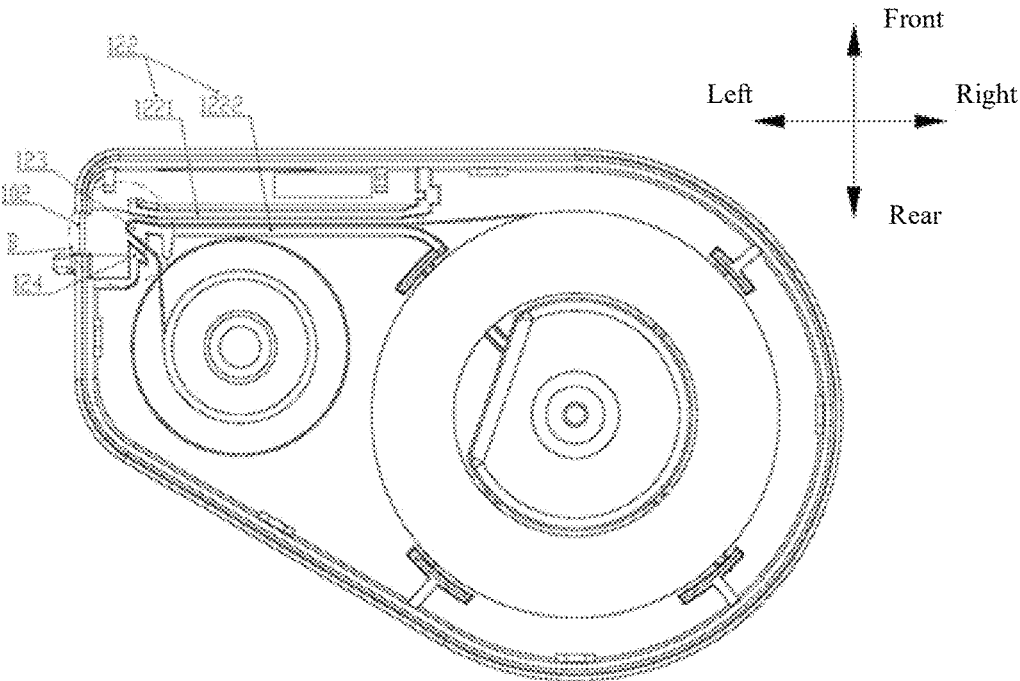
FIG. 4 is a top view of the internal structure of the sticker machine shown in FIG. 2 in cooperation with a sticker roll.
Figure 5:
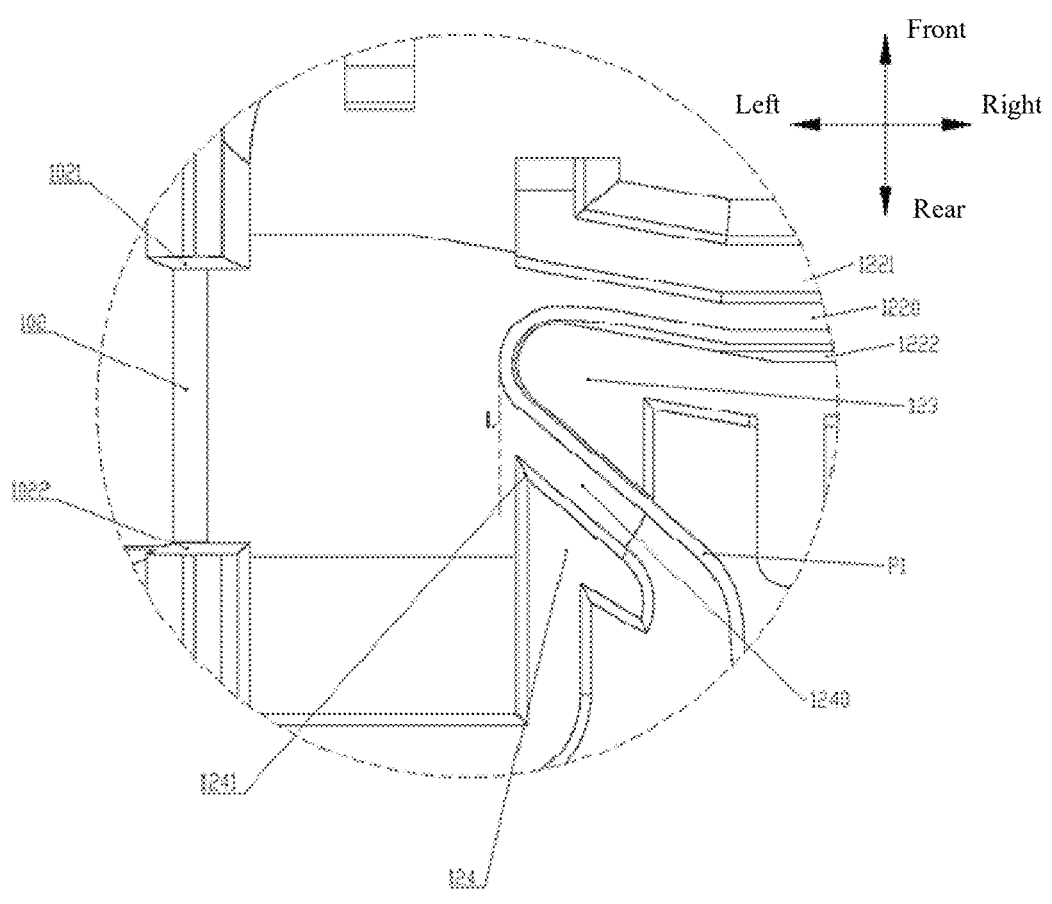
FIG. 5 is a partially enlarged view of area B in FIG. 4.

As shown in FIGS. 4 and 5, when viewed in a direction perpendicular to the thickness of the liner, i.e., when viewed in a direction perpendicular to the plan surface shown in FIGS. 4 and 5, the distance between the peeling blade 1241 and the output port 102 is equal to or greater than the distance between an outer surface of the liner paper P1 and the output port 102 when the liner paper P1 covers the turning peeling portion 123. As shown in FIG. 5, the broken auxiliary line L is the position where the outer surface of the liner paper P1 is located when the liner paper P1 covers the turning peeling portion 123, in which case the peeling blade 1241 is located on an inner side of the broken auxiliary line L, i.e., a side away from the output port 102. Such a setting ensures that the peeling blade 1241 can abut against the adhesive side of the liner paper P2 that crosses over the turning peeling portion 123, so as to peel off the liner paper P2 again. In addition, the peeling blade 1241 shall not be too far away from the output port 102; otherwise, although the peeling blade 1241 can still peel the sticker P2 off, the peeled sticker P2 is in that sticker machine and cannot be output from the output port 102. Therefore, the distance between the peeling blade 1241 and the output port 102 is set to be equal to or greater than the distance between an outer surface of the liner paper P1 and the output port 102 when the liner paper P1 covers the turning peeling portion 123, such that the sticker P2 peeled by the peeling blade 1241 against the peeling blade 1241 can still enter the output port 102 smoothly and be output. In the conveying direction of the sticker P2, i.e., the right-to-left direction shown in FIG. 5, the upper surface of the turning peeling portion 123 extends at an incline in a direction away from the liner guiding portion 124, which may enable the turning peeling portion 123 to guide the sticker P2 to move upward in an inclined direction first, and then the liner paper P1 is suddenly turned, which is more favorable for the peeling of the sticker P2. Moreover, since a portion of the sticker P2 peeled by the turning peeling portion 123 is in an overhanging position and has a drooping inclination under the effect of gravity, the tilting extension described above enables the sticker P2 to have a tilting upward movement, which can offset the drooping displacement of the peeled portion of the sticker P2 under the effect of gravity, such that it is more favorable for the peeled portion of the sticker P2 to extend into the output port 102.

Referring to FIGS. 6 to 11, the sticker machine 100 includes a housing 1, a motor 3, a winding shaft 4, a transmission mechanism 5, a power switch 61, and a start-up assembly 62.

The above-mentioned turning peeling portion 123, sticker guiding portion 122, and liner guiding portion 124 are arranged on the housing 1. Each of the components included in the sticker machine 100 is described separately below.

Referring to FIGS. 6 to 8, the housing 1 may be a plastic member, and the turning peeling portion 123, sticker guiding portion 122, and liner guiding portion 124 are integrally molded and injection molded onto the housing 1. The housing 1 defines a sticker compartment 101, and the long strip of liner paper P1 adhering to the sticker P2 is wound into a roll or folded into a laminated form, and placed in the sticker compartment 101; the output port 102 connects the sticker compartment 101 with an outside of the housing 1, such that the sticker P2 can be conveyed from the sticker compartment 101 to the output port 102 and partially exposed to the outside of the housing 1, for the user to remove the sticker P2. In the embodiments, the housing 1 includes an upper cover 11, a seat body 12, and a lower cover 13, where the upper cover 11 and the lower cover 13 are each in the form of a plate, and the seat body 12 is in the form of a box with a bin. The housing 1 has at least one outer peripheral plate, the at least one outer peripheral plate defining the sticker compartment 101 within the housing 1. In the embodiments, the seat body 12 includes the outer peripheral plate constituting a peripheral wall, and a bottom wall connected to a lower end of the outer peripheral plate, with an opening at an upper part of the seat body 12. The peripheral plate and bottom wall enclose the sticker compartment 101, the upper cover 11 being disposed covering the upper opening of the seat body 12 to cover the sticker compartment 101. The lower cover 13 is disposed underneath the bottom wall of the seat body 12, and a space for mounting a transmission mechanism 5 is defined between the lower cover 13 and the bottom wall of the seat body 12.

The housing 1 includes an envelope 121 extending into the sticker compartment 101. The envelope 121 is in the form of a cylinder with a downward opening. Specifically, the envelope 121 extends upwardly from a bottom wall of the seat body 12, defining an opening at a junction with the bottom wall to allow at least a portion of the motor 3 to be inserted through the opening into the envelope 121 to extend into the sticker compartment 101. The shape and dimensions of the envelope 121 are required to be configured such that the sticker roll 2 can be sleeved on and rotated around the envelope 121. Specifically, the sticker roll 2 has a central positioning hole 201, the envelope 121 is able to be threaded into the central positioning hole 201 for locating the sticker roll 2, and the dimension of the envelope 121 in a radial direction is smaller than the radial dimension of the central positioning hole 201 to ensure that the sticker roll 2 is able to be sleeved into the central positioning hole 201 of the sticker roll 2. In the embodiments, the radial dimension of the central positioning hole 201 is set to be significantly larger than the radial dimension of the envelope 121, such that after the liner paper P1 and the sticker P2 wound therein are reduced, the sticker paper roll 2 is able to be eccentrically oriented to a side with respect to the envelope 121, so as to facilitate the conveyance of the sticker P2. The envelope 121 is arranged in the form of a substantially cylindrical cylinder to facilitate rotation of the sticker roll 2 on the envelope 121. The envelope 121 is arranged with an avoidance portion, and a pick-up space 1211 is defined between the avoidance portion and a wall of the central positioning hole 201, the sticker roll 2 being suitable for being held and removed from the pick-up space 1211. In the embodiments, at least a portion of the motor 3 is disposed in the envelope 121, and the envelope 121 is arranged in the form of a cylindrical cylinder with a vertical plane on the peripheral wall in order to facilitate a mounting alignment with the motor 3, the vertical plane forming the avoidance portion. The motor 3 is arranged with a positioning portion (e.g. a plane on the peripheral wall of the motor 3) corresponding to the avoidance portion, the positioning portion cooperating with the avoidance portion to allow the motor 3 and the envelope to be positioned relative to each other in a circumferential direction, and the motor 3 to be positioned and mounted inside the envelope 121. In the embodiments, the sticker machine 100 is in the shape of a whistle, and the dimensions of an external contour of the sticker machine 100 are set in a decreasing size when viewed in a direction from upstream to downstream of the sticker conveying direction.

The turning peeling portion 123 is formed within the seat body 12 of the housing 1, and the turning peeling portion 123 is able to cause the sticker P2 to be peeled off from the liner paper P1 by conveying the liner paper P1 in a direction different from the travel direction of the sticker P2. In other words, the turning peeling portion 123 is configured to direct the extension direction of the liner paper P1 at the turning peeling portion 123 to bend relative to the extension direction of the liner paper P1 when in the sticker conveying channel 1220, thereby causing the sticker P2 to be peeled off from the liner paper P1. In the embodiments, an acute angle is formed between the portion of the liner paper P1 extending at the turning peeling portion 123 and the portion of the liner paper P1 extending on the sticker conveying channel 1220, so as to make the bending curvature of the liner paper P1 produced by the turning peeling portion 123 greater, which is favorable for the peeling of the sticker P2. In the conveying direction of the sticker P2, the sticker conveying channel 1220 is disposed at a position further upstream than the turning peeling portion 123 and close to the turning peeling portion 123. The sticker P2 is conveyed in a right-to-left direction as shown in FIGS. 2 to 5, with the right side at a position upstream of the left side. The liner paper P1 to which the sticker P2 is adhered is wound into the sticker roll 2 disposed on the envelope 121, and a lead end of the sticker roll 2 passes through the sticker conveying channel 1220 and then is wound on the winding shaft 4. A conveying portion 21 of the sticker roll 2 is disposed in the sticker conveying channel 1220, with a side of the conveying portion 21 facing the limiting portion 1221, and the other side of the conveying portion 21 facing the carrying portion 1222. The side facing the limiting portion 1221 is also the front-facing side shown in FIGS. 2 to 5, has a sticker P2 adhered thereto.

The liner guiding portion 124 is formed on the seat body 12 of the housing 1, and the liner guiding portion 124 is configured to assist in the peeling of the sticker P2. The liner guiding portion 124 has a peeling blade 1241 for peeling the sticker P2 from the liner paper P1 that crosses the turning peeling portion 123. In some cases, after the liner paper P1 passes through the turning peeling portion 123, the sticker P2 on the liner paper P1 follows the liner paper P1 through the turning peeling portion 123, and only opens a small opening so as not to expose the output port 102. By arranging the liner guiding portion 124, it is possible to further peel off the above sticker P2 which only opens a small opening so as not to expose the output port 102. The sticker P2 which has crossed the turning peeling portion 123 is pressed against the peeling blade 1241 of the liner guiding portion 124 while following the liner paper P1 backward and to the right, thereby causing the sticker P2 to be peeled off. Since the peeling blade 1241 is pushing against the adhesive-provided side of the sticker P2, in order to avoid the sticker P2 from sticking to the peeling blade 1241, the peeling blade 1241 is arranged as a sharp-edged blade-like structure to reduce the contact area with the sticker P2, thereby reducing the risk of adhesion with the sticker P2. A liner guide gap 1240 for passage of the liner paper P1 with the sticker P2 peeled off is defined between the liner guiding portion 124 and the turning peeling portion 123. The liner paper after passing through the liner guide gap 1240 is wound on the winding shaft 4.

Referring to FIGS. 8 to 11, the winding shaft 4 is configured to wind the liner paper P1 to convey the sticker P2 to the output port 102. The motor 3 is configured to output rotational power and is connected to the winding shaft 4 through a transmission mechanism 5 to drive the winding shaft 4 to rotate, for driving the liner paper P1 to be pulled to realize the conveyance and peeling of the sticker P2. After the sticker P2 is peeled off, the liner paper P1 is wound on the winding shaft 4 to form a liner roll 22. A body of the motor 3 is disposed in the envelope 121 in the sticker compartment 101, an output shaft of the motor 3 is facing down and disposed between the lower cover 13 of the housing 1 and the bottom wall of the seat body 12, a lower end of the winding shaft 4 is also disposed between the lower cover 13 of the housing 1 and the bottom wall of the seat body 12, and the transmission mechanism 5 is disposed between the lower cover 13 of the housing 1 and the bottom wall of the seat body 12 and is transmission-connected between the output shaft of the motor 3 and the winding shaft 4. The transmission mechanism 5 includes a gear set connected between the motor 3 and the winding shaft 4, the gear set including a driven gear coupled to the winding shaft 4. The winding shaft 4 is arranged with a sleeve portion 41 at the lower end of the winding shaft 4 which is engaged with the driven gear. Specifically, in the embodiments, the gear set includes a first gear 51, a second gear 52, a third gear 53, and a fourth gear 54, the second to fourth gears being double-layer gears. The first gear 51 is sleeved on the output shaft of the motor 3, the second gear 52 is connected to the first gear 51 in a meshing transmission, the third gear 53 is connected to the second gear 52 in a meshing transmission, and the fourth gear 54 is connected to the third gear 53 in a meshing transmission. The fourth gear 54 is the driven gear as described above, and an inner wall surface of the sleeve portion 41 of the winding shaft 4 is arranged with a tooth structure to mesh with the fourth gear 54. The second gear 52 is fixedly arranged with a second gear shaft 521, the third gear 53 is fixedly arranged with a third gear shaft 531, and the fourth gear 54 is fixedly arranged with a fourth gear shaft 541. The gear shafts are provided for realizing the support mounting of the corresponding gears between the lower cover 13 and the bottom wall of the seat body 12, where an end of the fourth gear shaft 541 facing the winding shaft 4 is inserted in the winding shaft 4 by means of interference fit, so as to ensure a reliable connection between the fourth gear 54 and the winding shaft 4.

When in use, the sticker roll 2 is mounted in the sticker compartment 101 and sleeved on the envelope 121, and a starting end of the liner paper P1 is wound on the winding shaft 4; the mounting of the sticker roll 2 and the winding of the starting end of the liner paper P1 may be assembled beforehand by the sticker machine 100 before shipment; the power switch 61 is turned on such that the power supply is supplied to power-using parts of the sticker machine 100; and the motor 3 is controlled to rotate by pushing down on the start-up assembly 62, to drive the winding shaft 4 through the transmission mechanism 5, such that the winding shaft 4 rotates and pulls the liner paper P1 and sticker P2 to move from the sticker roll 2 to the output port 102; after the liner paper P1 passes through the sticker conveying channel 1220 and the turning peeling portion 123, the sticker P2 is peeled off and exposed to the output port 102; for the sticker P2 that is not peeled off by the turning peeling portion 123 one time, after the sticker P2 crosses the turning peeling portion 123, it is pushed against the liner guiding portion 124 and peeled again to be exposed in the output port 102; the sticker machine 100 further includes a detection sensor located at the output port 102, and when the sticker P2 is detected at the output port 102, the motor 3 is controlled to stop, so as to realize the peeling out of one sticker P2 by pressing the start-up assembly 62 once, for dispensing the sticker P2.

The sticker machine 100 provided in the present disclosure may be a sticker dispenser for toys, i.e., a toy for children's entertainment or a component of a toy for children's entertainment, which is compact, lightweight, and easy to carry and use. The sticker machine 100 may be a stationery item for study and office use.

As can be seen from the above description of specific embodiments, the sticker machine 100 provided in the present disclosure includes a turning peeling portion 123 and a sticker guiding portion 122, where the sticker guiding portion 122 is disposed at a position further upstream than the turning peeling portion 123 in a conveying direction of the sticker P2, and the sticker guiding portion 122 is configured to guide the sticker P2 to be conveyed to the turning peeling portion 123 in a prescribed direction, so as to cause the peeled sticker P2 into the output port 102. As the sticker P2 conveyed to the turning peeling portion 123 is guided by the sticker guiding portion 122, the sticker P2 is made to travel in the prescribed direction, such that the peeled sticker P2 is able to enter the set output port 102, thereby facilitating the peeling and output of the sticker P2.

Embodiment II

Referring to FIGS. 12 to 14, which are schematic views of a sticker machine in Embodiment II of the present disclosure, the sticker machine includes a photoelectric device 31 and a shading portion 1023. The photoelectric device 31 is configured to obtain output information of the sticker according to a photoelectric signal, and the photoelectric device 31 is disposed close to the output port 102. The shading portion 1023 is configured to block an external light from being incident on the photoelectric device 31 through the output port 102, and the shading portion 1023 is configured to prevent the external light from interfering with the photoelectric signal.

Further, the shading portion 1023 is formed on an edge of the output port 102 and extends from the output port 102 towards the photoelectric device. The shading portion 1023 is arranged with an anti-adhesive portion 1024 on a surface opposite the adhesive surface of the sticker, and the anti-adhesive portion 1024 may be a convex rib or bump, the convex rib or bump having an edge formed on the top.

In the embodiments, the sticker machine 100 includes a sticker box 20 detachably arranged in the seat body 12. The sticker box 20 includes a box lid 24 and a box body 23, the sticker roll 2 is arranged inside the sticker box 20, and the sticker box 20 can be removed as a whole for replacement. The seat body 12 is arranged with an operating circuit board in a shell of the seat body 12, and the photoelectric device 31 is arranged on the operating circuit board; the shell of the seat body 12 is arranged with a cover plate 14 covering the operating circuit board, the cover plate 14 defining an avoidance hole 140 for avoiding the photoelectric device 31 so as to make it visible. The avoidance hole 140 is configured to avoid the photoelectric device 31 from being obstructed by the cover plate 14. The cover plate 14 obscures a large portion of the operating circuit board and may provide protection to the operating circuit board. In other embodiments, the sticker machine 100 may not include a sticker box 20, for example, by arranging relevant structures supposed to be on the sticker box 20 directly on the seat body 12.

The sticker machine 100 provided in the embodiments includes a photoelectric device 31 disposed close to the output port 102, and the photoelectric device 31 is configured to detect sticker output information, thereby facilitating the enhancement of intelligent control and intelligent prompting of the sticker machine 100, etc. The sticker machine 100 includes a shading portion 1023, the shading portion 1023 being configured to block an external light from being incident on the photoelectric device 31 through the output port 102, thereby avoiding influencing its detecting accuracy, which makes the detection more accurate, avoids misjudgment, and improves the accuracy of the intelligent control and intelligent prompting of the sticker machine 100.

Embodiment III

Referring to FIG. 15 and FIG. 16, which are schematic views of a sticker machine in Embodiment III of the present disclosure, the sticker is a mosquito repellent sticker that can emit a mosquito repellent odor. The sticker machine 100 further includes:

an airtight device 7, which can separably seal and close the output port 102 for preventing the odor of the mosquito repellent sticker from escaping from the output port 102 when the sticker machine 100 is in a non-operational state.

Further, the airtight device 7 includes a plug portion 71 inserted into the output port 102 and a cover portion 72 connected to the plug portion 71, the cover portion 72 covering an outside of the output port 102. The airtight device 7 further includes a connection portion 73, the connection portion 73 being configured such that the airtight device 7 can be attached to the sticker machine 100 by means of the connection portion 73 when the airtight device 7 is separated from the output port 102.

When in use, the plug portion 71 is inserted into the output port 102 of the mosquito repellent sticker and is in extruded contact with an inner wall surface of the output port 102, so as to realize the fixation of the plug portion 71 and realize the sealing of the output port 102; the cover portion 72 is disposed outside of the output port 102, such that the sealing can be further improved. In addition, by virtue of the cover portion 72, the plug portion 71 of the airtight device 7 may be easily pulled out of the output port 102. An edge of the cover portion 72 may be further extended with a convex extension for a user to pinch to remove the airtight device 7 from the output port 102. In the embodiments, the airtight device 7 is a flexible member, and the flexible member is elastically deformable so as to facilitate an interference fit with the output port 102 to achieve fixation of the two and a better sealing. In the embodiments, the airtight device 7 may be a rubber member, such as a silicone member.

When the sticker machine 100 is in use, the airtight device 7 is pulled out from the output port 102, and the power supply of the sticker machine 100 is activated to peel the mosquito repellent sticker from the liner paper and output the sticker from the output port 102. The user may then remove the mosquito repellent sticker and attach it to the arm or clothing and other parts, in order to play the role of emitting a fresh scent, repelling mosquitoes and bugs, refreshing and waking up, and tranquilizing and helping to sleep, etc. When the sticker machine 100 is not in use, the plug portion 71 of the airtight device 7 is inserted into the output port 102 to stop the odor of the undistributed mosquito repellent stickers from emanating from the output port 102.

Embodiment IV

Referring to FIGS. 17 to 22, which are schematic views of a sticker machine in Embodiment IV of the present disclosure, the main difference between Embodiment IV and Embodiment I is that the driving method is different, where the sticker machine is driven by a motor in Embodiment I and the sticker machine is driven manually in Embodiment IV herein.

Specifically, the manual sticker machine 100 includes a winding shaft 4, a transmission mechanism, and an operating member 8. The operating member 8 is connected to the transmission mechanism, and the transmission mechanism is power-transferably connected to the winding shaft 4. The operating member 8 is configured to operatively reciprocate within a set range; specifically, the operating member 8 is configured to be driven by an operating force to move in a first direction to move from a first position to a second position, as well as to move in a second direction opposite to the first direction to reset from the second position to the first position when the operating force is released. During the movement of the operating member 8 from the first position to the second position, a continuous power transmission chain is formed between the operating member 8, the transmission mechanism, and the winding shaft 4 to drive the winding shaft 4 in a positive rotation to wind the liner paper. During the resetting of the operating member from the second position to the first position, the power transmission chain is disconnected at least in one place between the operating member 8, the transmission mechanism, and the winding shaft 4, in order to avoid driving the winding shaft 4 in reverse.

In the embodiments, the sticker machine 100 includes a seat body 12, an upper cover 11 disposed at a top of the seat body 12, and a lower cover 13 disposed at a bottom of the seat body 12. The operating member 8 is a pressable component, specifically a lever mechanism, configured to pivot around a set axis. The operating member 8 is pivotally connected to a housing of the sticker machine 100, which includes a pressing portion and a rack portion 801. The pressing portion is exposed to the housing and can be pressed by a user. The operating member 8 is in the first position before being pressed and is movable to the second position after being pressed. When the pressing portion is pressed, the operating member 8 rotates about its pivot shaft, moving the rack portion 801. The operating member is a one-piece part, e.g. plastic injection molded, and the rack portion 801 has multiple teeth integrally molded for use in conjunction with the transmission mechanism for transmitting power. In the embodiments, the rack portion 801 is curved and an axis of the curved shape is an axis of the pivot shaft of the operating member 8. The operating member 8 is resiliently pressed against the rack portion 801 by a reset spring 84, and the reset spring 84 provides a resilient force in the opposite direction to that of the pressing force. When the pressing force applied to the pressing portion is withdrawn, the reset spring 84 pushes the operating member 8 to rotate and reset to the first position prior to the application of the pressing force.

The transmission mechanism is a gear train transmission mechanism including multiple gears coupled to each other, which is configured to connect the operating member 8 and the winding shaft 4 in a transmission, and to transmit the power output from the operating member 8 to the winding shaft 4 in order to drive the winding shaft 4 to rotate. The transmission mechanism includes a one-way clutching device, which is configured to be coupled when the operating member 8 is moved in the first direction to implement the power transmission, and to be uncoupled when the operating member 8 is moved in the second direction opposite to the first direction to disconnect the power transmission. In the embodiments, the transmission mechanism includes a driven gear 83 fixed relative to the winding shaft 4, an actuating gear 81 driven in engagement with the rack portion 801 of the operating member 8, and a movable gear 82 disposed between the driven gear 83 and the actuating gear 81. Specifically, the transmission mechanism includes the actuating gear 81 located upstream of and remaining coupled to the movable gear 82 in the power transmission direction, and the driven gear 83 located downstream of and detachably coupled to the movable gear 82 in the power transmission direction.

A gear shaft of the actuating gear 81 is non-translatably connected to the housing, and the actuating gear 81 is only capable of rotating about the axis of its gear shaft and is not movable in its axial and radial directions. In the embodiments, the actuating gear 81 is a double-layered tower gear having a small-diameter wheel 811 and a large-diameter wheel 812 that are arranged coaxial, the small-diameter wheel 811 of the actuating gear 81 being engaged with the rack portion 801 of the operating member 8, and the large-diameter wheel 812 of the actuating gear 81 being engaged with the movable gear 82. In other embodiments, the large-diameter wheel 812 may be understood as an actuating gear, and the small-diameter wheel 811 as a first gear further included in the transmission mechanism and coupled to the rack portion 801, the first gear and the actuating gear being coaxially disposed. The diameter D of the actuating gear is greater than double the diameter d of the first gear.

The movable gear 82 is configured to be movable between a coupled position and a detached position, i.e. the gear shaft of the movable gear 82 is translationally connected to the housing, while the movable gear 82 is also rotatable about an axis of its gear shaft. An end of the gear shaft of the movable gear 82 is connected to the bottom wall of the seat body 12 and the other end of the gear shaft of the movable gear 82 is connected to the lower cover 13. Specifically, each of the bottom wall of the seat body 12 and the lower cover 13 defines a guide slot 131 configured for the ends of the gear shaft of the movable gear 82 to be inserted and slide therein. When the rack portion 801 of the operating member 8 is engaged with the movable gear 82, the movable gear 82 can be pushed to slide along the guiding slot 131. When the movable gear 82 slides to the coupled position, it can engage with the driven gear 83. When the movable gear 82 slides to the detached position, it can disengage with the driven gear 83.

In the embodiments, the one-way clutching device includes the movable gear 82 and a resilient member 85. The movable gear 82 is resiliently pushed against by the resilient member 85, and the resilient member 85 is configured to apply a resilient force to hold the movable gear 82 in the coupled position. When the operating member 8 moves in the second direction from the second position to the first position, the operating member 8 drives the movable gear 82 to overcome the resilient force and to slip to the detached position. The resilient member 85 may be a torsion spring or a resilient sheet, with a resilient arm that abuts against the movable gear 82 to exert the resilient force. In the embodiments, the resilient member 85 is a torsion spring having two resilient arms, one of which abuts against the movable gear 82 and the other abuts against the housing. In the embodiments, the spring force of the resilient member 85 is overcome to separate the movable gear 82 from the driven gear 83. In other embodiments, the resilient member 85 is configured to apply a resilient force for the movable gear 82 to remain in the detached position, and the operating member 8 drives the movable gear 82 to overcome the resilient force to slide to the coupled position when the operating member 8 moves in the first direction from the first position to the second position; herein when the operating force is released, the movable gear 82 is separated under the action of the spring force of the resilient member 85. For the embodiments, the resilient member 85 instantly drives the movable gear 82 to the detached position from the driven gear 83 when the external force on the operating member 8 is removed, such that the separation is timelier and the driven gear 83 can be better avoided from being driven to rotate in reverse. Further, there exists a small slip distance for the movable gear 82 to move from the detached position to the coupled position during the movement of the operating member 8 in the first direction, and the driven gear 83 is not driven in the slip distance, i.e. there exists a small empty travel distance of the operating member 8. In the embodiments, the reset spring 84 provides a resilient resetting force greater than the resilient force applied to the movable gear 82 by the resilient member 85.

In the embodiments, the movable gear 82 is a double-layered tower gear having a small-diameter wheel 821 and a large-diameter wheel 822 that are arranged coaxial, the small-diameter wheel 821 of the movable gear 82 being engaged with the driven gear 83, and the large-diameter wheel 822 of the movable gear 82 being engaged with the large-diameter wheel 812 of the actuating gear 81. The provision of the actuating gear 81 and movable gear 82 may serve to amplify the fact that the rotation angle of the actuating gear 81 is less than the rotation angle of the driven gear 83 during the movement of the operating member 8 from the first position to the second position.

Figure 21:
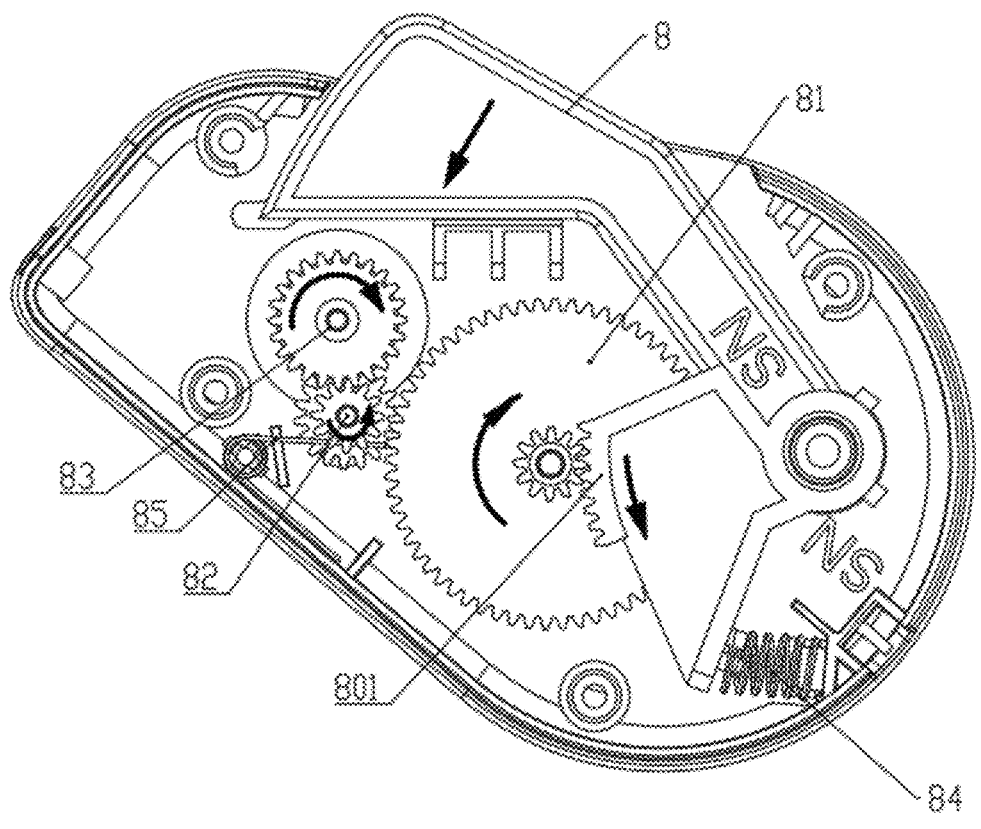
FIG. 21 is a schematic diagram of an action of a transmission mechanism when an operating member is pressed in the sticker machine shown in FIG. 17.

Focusing on FIG. 21, which is a schematic diagram of an action of the transmission mechanism during the movement of the operating member 8 in the first direction driven by an operating force: a force is applied to the pressing portion of the operating member 8 as shown by the arrow above thereof, the rack portion 801 of the operating member 8 rotates inwardly as shown by the arrow above thereof, and the actuating gear 81 rotates clockwise as shown by the arrow, in which case the movable gear 82 is pushed to translate in a direction close to the driven gear 83 and engage with the driven gear 83, and the driven gear 83 clockwise rotates as shown by the arrow, driving the winding shaft 4 to rotate in order to pull the liner paper to move, thereby realizing the peeling off of the sticker and the output of the sticker.

Figure 22:
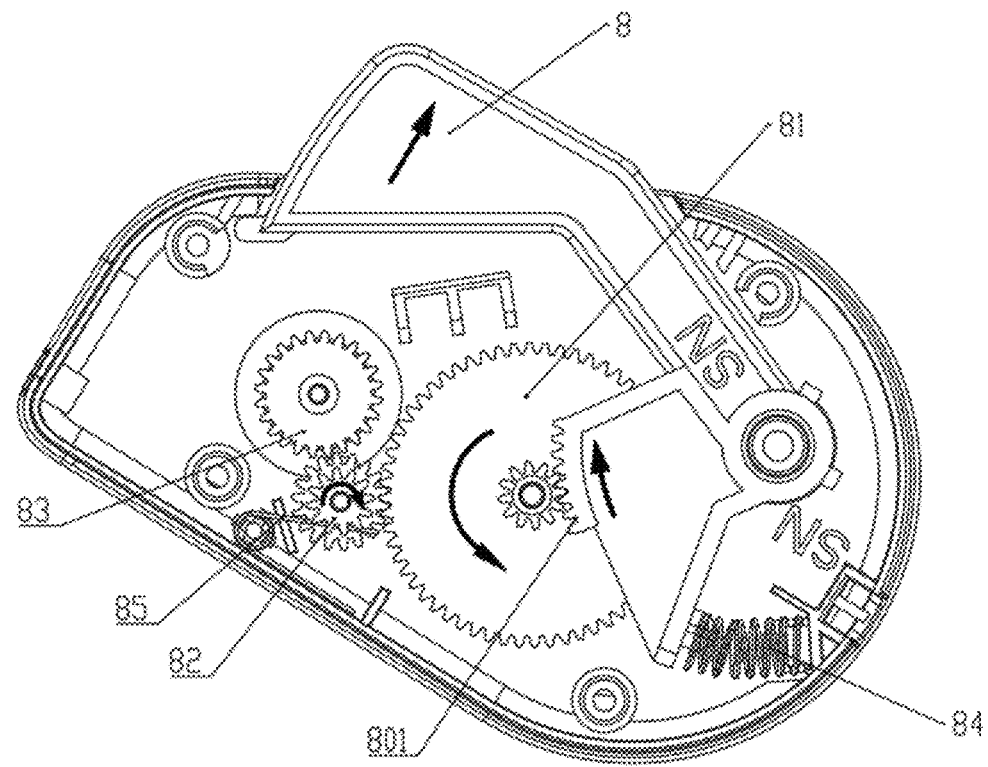
FIG. 22 is a schematic diagram of an action of a transmission mechanism when an operating member is reset in the sticker machine shown in FIG. 17.

Focusing on FIG. 22, which is a schematic diagram of an action of the transmission mechanism during a process in which the operating force applied to the operating member 8 is released and the operating member 8 is driven by the reset spring 84 to move in the second direction to reset to the first position: a force is applied to the rack portion 801 of the operating member 8 as shown by the arrow above thereof, the pressing portion of the operating member 8 moves outward as shown by the arrow above thereof, and the actuating gear 81 rotates counterclockwise as shown by the arrow, in which case the movable gear 82 is pushed to translate in a direction away from the driven gear 83 and disengage with the driven gear 83, and the rotation of the movable gear 82 driven by the actuating gear 81 is unable to be transmitted to the driven gear 83, i.e., the driven gear 83 does not rotate counterclockwise, and the winding shaft 4 does not move, thereby avoiding that the wound liner paper is loosened and the sticker paper cannot be output when the operating member is pressed next time, caused by the winding shaft 4 rotating counterclockwise in the course of resetting the operating member 8.

It should be noted that the present embodiments are illustrated with the movable gear 82 and the driven gear 83 being able to be disengaged as an example, and it can be understood that in other embodiments, it is sufficient to arrange such that a disengagement is feasible at any position in the transmission chain between the operating member 8 and the winding shaft 4. It should also be noted that, in the present embodiments, the switching between engagement and disengagement is achieved by translation of the movable gear 82, which in other embodiments can be achieved by means of a ratchet structure. For example, in some embodiments, the one-way clutching device is a one-way bearing, i.e. an overrunning clutch, which is coupled to a transmission gear within the transmission mechanism.

The present disclosure provides a sticker machine 100 for dispensing stickers manually, which may realize the output of stickers by manually applying force on the operating member 8, without using electrical components, thereby reducing costs and enhancing operability and entertainment.

The foregoing are only specific embodiments of the present disclosure, but the scope of the present disclosure is not limited thereto, and any changes or substitutions that can be readily conceived by those skilled in the art within the scope of the technology disclosed in the present disclosure shall be covered by the scope of the present disclosure. Therefore, the scope of the present disclosure shall be subject to the scope of the claims.

What is claimed is:

1. A sticker machine, for peeling a sticker from a liner paper during a conveying process of the sticker, comprising:
   a turning peeling portion, configured to cause the sticker to be peeled from the liner paper by conveying the liner paper in a direction different from a travel direction of the sticker; and
   a sticker guiding portion, configured to guide the sticker to be conveyed in a prescribed direction to the turning peeling portion, for causing the sticker after being peeled to enter an output port;
   wherein in a conveying direction of the sticker, the sticker guiding portion is disposed at a position further upstream than the turning peeling portion;
   wherein sticker machine further comprises a liner guiding portion; wherein the liner guiding portion is configured to guide the liner paper to be conveyed in a prescribed direction, for increasing a bending angle formed by the liner paper at the turning peeling portion;
   wherein the liner guiding portion comprises a peeling blade configured to peel off the sticker that is still adhered to the liner paper after passing through the turning peeling portion.

2. A sticker machine, for peeling a sticker from a liner paper during a conveying process of the sticker, comprising:
   a turning peeling portion, configured to cause the sticker to be peeled from the liner paper by conveying the liner paper in a direction different from a travel direction of the sticker; and
   a sticker guiding portion, configured to guide the sticker to be conveyed in a prescribed direction to the turning peeling portion, for causing the sticker after being peeled to enter an output port;
   wherein in a conveying direction of the sticker, the sticker guiding portion is disposed at a position further upstream than the turning peeling portion;
   wherein the sticker machine further comprises a housing, defining a sticker compartment for receiving a sticker roll and the output port; a winding shaft, capable of winding the liner paper to convey the sticker to the output port; and a motor, configured to output rotational power and in transmission-connection with the winding shaft; wherein the motor is at least partially disposed within the sticker compartment and is adapted to be threaded into a central positioning hole in the sticker roll;

wherein the housing comprises an envelope extending into the sticker compartment, and the motor is at least partially disposed within the envelope;

wherein the envelope is capable of being threaded into the central positioning hole to be adapted to locate the sticker roll.

3. The sticker machine according to claim 2, wherein the envelope is arranged with an avoidance portion, and the avoidance portion is capable of being defining a pick-up space between the avoidance portion and a wall of the central positioning hole, the sticker roll being suitable for being held and removed from the pick-up space.

4. The sticker machine according to claim 3, wherein the motor is arranged with a positioning portion corresponding to the avoidance portion, the positioning portion cooperating with the avoidance portion to allow the motor and the envelope to be positioned relative to each other in a circumferential direction.

5. A sticker machine, for peeling a sticker from a liner paper during a conveying process of the sticker, comprising:
a turning peeling portion, configured to cause the sticker to be peeled from the liner paper by conveying the liner paper in a direction different from a travel direction of the sticker; and
a sticker guiding portion, configured to guide the sticker to be conveyed in a prescribed direction to the turning peeling portion, for causing the sticker after being peeled to enter an output port;
wherein in a conveying direction of the sticker, the sticker guiding portion is disposed at a position further upstream than the turning peeling portion;
wherein the sticker machine further comprises a housing, defining a sticker compartment for receiving a sticker roll and the output port; a winding shaft, capable of winding the liner paper to convey the sticker to the output port; and a motor, configured to output rotational power and in transmission-connection with the winding shaft; wherein the motor is at least partially disposed within the sticker compartment and is adapted to be threaded into a central positioning hole in the sticker roll;
wherein a dimension of an external contour of the sticker machine is decreasing when viewed in a direction from upstream to downstream of the conveying direction of the sticker.

6. A sticker machine, for peeling a sticker from a liner paper during a conveying process of the sticker, comprising:
a turning peeling portion, configured to cause the sticker to be peeled from the liner paper by conveying the liner paper in a direction different from a travel direction of the sticker; and
a sticker guiding portion, configured to guide the sticker to be conveyed in a prescribed direction to the turning peeling portion, for causing the sticker after being peeled to enter an output port;
wherein in a conveying direction of the sticker, the sticker guiding portion is disposed at a position further upstream than the turning peeling portion;
wherein the sticker machine further comprises a photo-electric device, configured to obtain output information of the sticker according to a photoelectric signal and disposed close to the output port; and a shading portion, configured to block an external light from being incident on the photoelectric device through the output port and to prevent the external light from interfering with the photoelectric signal;
wherein the shading portion is formed on an edge of the output port and extends from the output port towards the photoelectric device.

7. The sticker machine according to claim 6, wherein a surface of the shading portion opposite to an adhesive surface of the sticker is arranged with an anti-adhesive portion, and the anti-adhesive portion is a convex rib or bump, a top of the convex rib or bump having an edge.

8. A sticker machine, for peeling a sticker from a liner paper during a conveying process of the sticker, comprising:
a turning peeling portion, configured to cause the sticker to be peeled from the liner paper by conveying the liner paper in a direction different from a travel direction of the sticker; and
a sticker guiding portion, configured to guide the sticker to be conveyed in a prescribed direction to the turning peeling portion, for causing the sticker after being peeled to enter an output port;
wherein in a conveying direction of the sticker, the sticker guiding portion is disposed at a position further upstream than the turning peeling portion;
wherein the sticker is a mosquito repellent sticker capable of emitting a mosquito repellent odor, and the sticker machine further comprises:
an airtight device, capable of separably sealing and closing the output port, for preventing the mosquito repellent odor from escaping from the output port in condition of the sticker machine being in a non-operational state.

9. The sticker machine according to claim 8, wherein the airtight device comprises a plug portion inserted into the output port and a cover portion connected to the plug portion, the cover portion covering an outside of the output port.

10. The sticker machine according to claim 9, wherein the airtight device further comprises a connection portion; the connection portion is configured, such that the airtight device is capable of being attached to the sticker machine by means of the connection portion in condition of the airtight device being separated from the output port.

11. The sticker machine according to claim 1, further comprising:
a housing;
a winding shaft, capable of winding the liner paper to convey the sticker to the output port;
an operating member, configured to operatively reciprocate within a set range; and
a transmission mechanism, transmission-connected to the operating member and the winding shaft, and capable of transmitting power output from the operating member to the winding shaft to drive the winding shaft to rotate;
wherein the transmission mechanism comprises a one-way clutching device; the one-way clutching device is configured to be coupled in condition of the operating member moving in the first direction to implement a transmission of the power, and to be uncoupled in condition of the operating member moving in the second direction opposite to the first direction to disconnect the transmission of the power.

12. The sticker machine according to claim 11, wherein the transmission mechanism is a gear train transmission mechanism comprising a plurality of gears coupled to each other; the one-way clutching device comprises:

a movable gear, movable between a coupled position and a detached position; and a force applying member, configured to apply a resilient force to the movable gear in a direction such that the movable gear remains in the coupled position;

wherein in condition of the operating member moving in the second direction, the movable gear is capable of overcoming the resilient force to move from the coupled position to the detached position.

13. The sticker machine according to claim 11, wherein the transmission mechanism is a gear train transmission mechanism comprising a plurality of gears coupled to each other; the one-way clutching device comprises:

a movable gear, movable between a coupled position and a detached position; and a force applying member, configured to apply a resilient force to the movable gear in a direction such that the movable gear remains in the detached position;

wherein in condition of the operating member moving in the first direction, the movable gear is capable of overcoming the resilient force to move from the detached position to the coupled position.

14. The sticker machine according to claim 12, wherein the transmission mechanism further comprises:

an actuating gear, disposed upstream of and remaining coupled to the movable gear in a transmission direction of the power; and a driven gear, disposed downstream of and detachably coupled to the movable gear in the transmission direction of the power;

wherein in condition of the operating member moving in the second direction, the actuating gear acts on the movable gear in a direction such that the movable gear is separated from the driven gear.

15. The sticker machine according to claim 13, wherein the transmission mechanism further comprises:

an actuating gear, disposed upstream of and remaining coupled to the movable gear in a transmission direction of the power; and a driven gear, disposed downstream of and detachably coupled to the movable gear in the transmission direction of the power;

wherein in condition of the operating member moving in the second direction, the actuating gear acts on the movable gear in a direction such that the movable gear is separated from the driven gear.

* * * * *